US008239162B2

(12) United States Patent
Tanenhaus

(10) Patent No.: US 8,239,162 B2
(45) Date of Patent: Aug. 7, 2012

(54) MINIATURIZED INERTIAL MEASUREMENT UNIT AND ASSOCIATED METHODS

(75) Inventor: Martin E. Tanenhaus, Annapolis, MD (US)

(73) Assignee: Tanenhaus & Associates, Inc., Annapolis, MD (US)

( * ) Notice: Subject to any disclaimer, the term of this patent is extended or adjusted under 35 U.S.C. 154(b) by 540 days.

(21) Appl. No.: 12/431,132

(22) Filed: Apr. 28, 2009

(65) Prior Publication Data

US 2009/0326851 A1 Dec. 31, 2009

Related U.S. Application Data

(63) Continuation-in-part of application No. 11/279,608, filed on Apr. 13, 2006, now Pat. No. 7,526,402.

(51) Int. Cl.
*G01C 9/00* (2006.01)
(52) U.S. Cl. ......................... 702/151; 702/145
(58) Field of Classification Search ............... 342/357.3, 342/357.32; 702/151, 96, 145, 1
See application file for complete search history.

(56) References Cited

U.S. PATENT DOCUMENTS

| | | | |
|---|---|---|---|
| 6,415,223 B1 | 7/2002 | Lin et al. | |
| 6,427,122 B1 | 7/2002 | Lin | |
| 6,463,802 B2 | 10/2002 | Hulsing, II | |
| 6,480,152 B2 | 11/2002 | Lin et al. | |
| 6,498,996 B1 | 12/2002 | Vallot | |
| 6,516,272 B2 | 2/2003 | Lin | |
| 6,658,354 B2 | 12/2003 | Lin | |
| 6,671,648 B2 | 12/2003 | McCall et al. | |
| 6,853,909 B2 | 2/2005 | Scherzinger | |
| 6,859,727 B2 | 2/2005 | Bye et al. | |
| 6,879,875 B1 | 4/2005 | Hu et al. | |
| 7,043,364 B2 | 5/2006 | Scherzinger | |
| 7,089,148 B1 | 8/2006 | Bachmann et al. | |
| 7,248,964 B2 | 7/2007 | Bye | |
| 7,289,906 B2 | 10/2007 | van der Merwe et al. | |
| 7,409,290 B2 | 8/2008 | Lin | |
| 2002/0008661 A1 | 1/2002 | McCall et al. | |
| 2002/0144548 A1* | 10/2002 | Cohn et al. ................. | 73/514.16 |
| 2003/0135327 A1 | 7/2003 | Levine et al. | |
| 2005/0033200 A1 | 2/2005 | Soehren et al. | |
| 2005/0040985 A1 | 2/2005 | Hudson et al. | |

(Continued)

OTHER PUBLICATIONS

Geen, John and Krakauer, David, "New iMEMS Angular-Rate-Sensing Gyroscope," Analog Dialogue 37-03, pp. 1-4, 2003.

(Continued)

*Primary Examiner* — Mark Hellner
(74) *Attorney, Agent, or Firm* — GrayRobinson, P.A.; Carl M. Napolitano

(57) ABSTRACT

An inertial measurement unit includes a base having a plurality of physically distinct sectors, upon which are positioned thereon three groups of orthogonally oriented angle rate sensors, each group positioned on a different sector of the base. Three high-G orthogonally oriented accelerometers are also positioned on the base, as well as three low-G orthogonally oriented accelerometers. A processor is positioned on the base having software resident thereon for receiving signals from the three groups of angle rate sensors and the three high-G and three low-G accelerometers. Software is also resident on the processor for calculating from the received signals one or more of the following: a change in attitude, a change in position, a change in angular rate, a change in velocity, and a change in acceleration of the unit over a plurality of finite time increments. Preferably, each gyro is subjected to oversampling, temperature and bias compensation, and bias offset compensation.

24 Claims, 19 Drawing Sheets

U.S. PATENT DOCUMENTS

2005/0114023 A1  5/2005  Williamson et al.
2005/0240347 A1* 10/2005 Yang .............................. 701/220

OTHER PUBLICATIONS

Oweiss, Karim G. and Anderson, David J., "Noise reduction in multichannel neural recordings using a new array wavelet denoising algorithm," Neurocomputing 38-40, pp. 1687-1693, 2001.

Van Der Merwe, Rudolph, Wan, Eric A., and Julier, Simon I., "Sigma-Point Kalman Filters for Nonlinear Estimation and Sensor-Fusion: Applications to Integrated Navigation", In Proceedings of the AIAA Guidance, Navigation & Control Conference (GNC), Providence, Rhode Island, pp. 1-30, Aug. 2004.

Galijan, Randy and Sinko, Jim, "Use of GPS Attitude Determination to Calibrate an Array of Inexpensive Accelerometers," Final Report for ITS-IDEA Project 77, pp. 1-16, Dec. 2001.

Chiang, Kai-Wei, INS/GPS Integration Using Neural Networks for Land Vehicular Navigation Applications, University of Calgary, Department of Geomatics Engineering, UCGE Reports No. 20209, 3 pages, Nov. 2004.

El-Sheimy, Naser, Shin, Eun-Hwan, and Niu, Xiaoji, "Kalman Filter Face-Off, Extended vs. Unscented Kalman Filters for Integrated GPS and MEMS Inertial," Inside GNSS, pp. 48-54, Mar. 2006.

Oweiss, Karim G. and Anderson, David J., "A New Approach to Array Denoising," Proc. of the IEEE 34th Asilomar Conference on Signals, Systems and Computers, 1, 1403-1407, Nov. 2000.

* cited by examiner

MINIATURIZED INERTIAL MEASUREMENT UNIT AND ASSOCIATED METHODS

CROSS-REFERENCE TO RELATED APPLICATIONS

This application is a continuation-in-part of patent application Ser. No. 11/279,608, filed Apr. 13, 2006, now U.S. Pat. No. 7,526,402, issue date Apr. 28, 2009, which itself claimed priority to provisional application Ser. No. 60/672,724, filed on Apr. 19, 2005, entitled "Shock-Hardened Integrated 3D MEMS Gyro/Accelerometer and DSP Inertial Measurement Unit."

TECHNICAL FIELD

The present invention generally relates to inertial measurement and navigation devices, and, in particular, to such devices that are miniaturized, and to signal processing methods therefor.

BACKGROUND

An inertial measurement unit (IMU) is a closed system that is used to detect changes in angular rate and velocity. As a closed system it is used to detect attitude and motion changes, and can be employed to determine the motion of a carrier, such as aircraft, and geo-location measurements on sensor equipment, wearable computing, e.g., as in movement detection measurements of soldiers operating on the ground, and camera stabilization platforms. A conventional IMU detects acceleration and rate of change in attitude (i.e., roll, pitch, and yaw rates) and measures these parameters over time to find the total change from the initial position. A conventional IMU is not an inertial navigation system, since it does not know its own location, but an extended IMU can provide additional data such as velocity, position, heading attitude, pitch, roll, angular rates, and acceleration with inherent error correction, with accuracies many orders of magnitude greater than that of an inertial navigation unit.

An IMU does not detect linear velocity and position directly, which are computed parameters, by integration and double integration, based on measured accelerations, angular rates, and initial conditions. Small errors in acceleration can cause large errors in velocity and position.

Conventional IMUs are generally associated with high cost, large bulk, high power consumption, limited lifetime, and long turn-on time. The high cost and large size in particular have generally precluded application of IMUs to technologies such as geolocation measurements on sensor equipment; wearable computing (e.g., in movement detection measurements of soldiers operating on the ground), and camera stabilization platforms.

Other difficulties with convention IMUs include accumulated error, since the IMU is continually adding detected changes to the current position, and any error in the measurement is cumulative, leading to "drift." Such drift can comprise in a range of 100-200 deg/h.

Navigation systems can also employ global positioning satellite (GPS) system to correct for long-term drift in position determination by the IMU.

Micro Electro-Mechanical System (MEMS) technology has resulted in the development of a micro, low-cost IMU that comprises MEMS angular rate and acceleration sensors on silicon chips. However, despite their enormous cost, size, weight, thermal stability, and wide dynamic range advantages over conventional inertial sensors, the MEMS IMUs generally yield less precise and accurate measurements relative to their conventional IMU counterparts.

It is also known to use a high-precision positioning and data integrated system comprising a MEMS IMU, two GPS systems providing raw data, and a centralized processing module that comprises Kalman filter integration to correct various measurement errors such as tilt angle shifts, velocity error, and accelerometer errors received by the device's navigation module. However, GPS systems may be blocked by obstructions, thereby reducing the effectiveness of the system.

The concept of a "virtual gyro" has also been explored, wherein gyroscopes are replaced with an array of relatively inexpensive accelerometers. The system comprises distributed accelerometers combined with a multiple-antenna, GPS-based, attitude-determination system. In this system, however, accelerometer noise is known to be a major source of error in both angular and linear parameters.

One critical cause of error in position measurement is error in the orientation determined by the gyros. This is so because the maturity of MEMS accelerometers, now in the 100-mg class, has put extreme pressure on the pitch and roll accuracy to reach the same level of performance, which is far more difficult for the gyros than for the accelerometers.

While the invention disclosed in the parent '402 patent advanced the field of IMUs significantly, further testing determined that additional algorithm and packaging improvements would be required in order that the device meet certain predetermined criteria for accuracy and robustness when used under extreme conditions. Therefore, it would be advantageous to provide an improved algorithm suite and improved packaging for an IMU for use, for example, in such extreme conditions.

SUMMARY

The present invention provides a self-contained, integrated micro-cube-sized IMU in which component sensors can provide not only changes in angular rate and velocity, but also attitude, azimuth, position, and velocity data to high accuracy. The accuracy is achieved through the use of specifically oriented sensors, the orientation serving to substantially cancel noise and other first-order effects, and the use of denoising algorithms to reduce the noise of MEMS gyro and accelerometer devices, and an error-correcting algorithm such as a Kalman filter embedded in a digital signal processor (DSP) device. In an additional DSP, a navigation-grade Kalman filter algorithm couples to the IMU to provide navigation-grade performance results. The IMU Kalman filter and the navigation-grade KF algorithm exhibit a synergistic effect whereby more accurate results are obtained through a reduction in sensor bias than if the IMU filter or algorithm is used alone. Since the navigation KF algorithm normally requires floating-point computations, a separate computational engine is dedicated to its operation.

In a particular embodiment, an inertial measurement unit of the present invention comprises a base comprising a plurality of physically distinct sectors. Three sets of angle rate sensors are orientable triaxially in a first direction, each set mounted on a different sector of the base orientable normal to the other two and comprising N gyroscopes oriented at 360/N-degree increments, where $N \geq 2$. Three further sets of angle rate sensors are orientable triaxially in a second direction opposite the first direction, each set mounted on a different sector of the base orientable normal to the other two and comprising N gyroscopes oriented at 360/N-degree increments, where $N \geq 2$.

At least one accelerometer is positioned on the base adapted to provide three signals containing triaxial accelerometer data as well as, with heavy filtering on these outputs, three additional signals that contain inclination pitch, roll, and yaw data. Note that arrays of accelerometer devices may be arranged exactly the same way as the gyro devices to eliminate or greatly reduce dc errors, although this is not intended as a limitation. Means are provided for outputting signals from the six sets of angle rate sensors, the three accelerometer signals, and three inclination signals to a processor for calculating at least one of a change in attitude, position, angular rate, acceleration, and velocity of the unit.

The invention can sustain G forces that could affect the integrity of the IMU's components and hence the accuracy of the angular rate, acceleration, and location measurements through the use of a semi-rigid flex board containing the sensors and the DSP. The semi-rigid flex board can be housed in a protective structure that permits the sensors and DSP IMU to survive high G environments with little or no potting and remain precisely aligned in all three dimensions to measure range, pitch, and yaw of, for example, guided munitions during flight.

The invention can provide a means of measuring angular rates and acceleration when GPS data are not present for long periods of dead time. An on-board GPS can be integrated with the IMU to initiate accurate solutions when GPS data are available.

The invention can also provide a fully integrated IMU containing a magnetometer for determining the down position of the navigational carrier to avoid orientation problems and to report true North.

The fully integrated IMU of the present invention is lightweight and compact in size for mounting on individuals, such as soldiers, to detect movement, as well as to determine instantaneous motion change and new position on low-cost stabilization platforms. The invention in a preferred embodiment has a volume less than 1.9 in.$^3$ and a weight of less than 0.05 pound.

An additional feature of the present invention is directed to an integrated IMU that can be assembled in a plane on a base having a plurality of sectors that are foldable relative to each other to create a three-dimensional device wherein the sectors have a predetermined and desired orientation relative to each other.

The gun-rugged "virtual IMU" approach of the present invention significantly improves the performance over a single gyro per axis by combining multiple devices in an optimum way using both hardware alignment techniques and algorithms processed in its embedded DSP. As more performance is required, the virtual design can be exploited to achieve improved performance. One important feature implemented is the use of a combination of algorithms to gain improved performance and the alignment of hardware devices to reduce dc errors. A set of gyro devices for each axis is oriented into an array of devices that reduces the dc errors common to all MEMS gyros. Although a set of gyros made up of two subarrays must use exactly the same count, in a particular embodiment each axis comprises an array of two subarrays equal to eight gyro devices.

Although MEMS gyros and accelerometers typically provide imprecise data due to bias drift and turn-on instability, the V-IMU specifically attempts to cancel both gyro and accelerometer bias and bias drift terms and misalignment errors, acceleration errors (G-sensitive), nonlinear (square term), and scale factor errors. A gyro array layout to cancel most dc errors and a pre-filter designed to denoise the resulting signal eliminates errors typically associated with the bias terms.

The virtual gyro signals are processed separately and can be selected as a single channel, the running average of 8 channels, or a twin matrix of opposing 4×4 signals. The devices in each matrix are summed and then either denoising filters are applied to each data stream before subtraction or the two streams are subtracted one from the other and the denoising filters applied to the difference. The wavelet denoising algorithm improves the performance of a selected set of gyros in each axis. The wavelet denoising algorithm can be applied to a single gyro channel per axis, or to multiple gyros processed as the sum of the top set of devices in the array. The denoising algorithm can be applied to a single accelerometer channel per axis or multiple accelerometers can be combined and processed to reduce the drift and dc errors.

Another embodiment is directed to an IMU that comprises precision inertial measurement technology and an embedded advanced heading algorithm suite. The device comprises a base having a plurality of physically distinct sectors. Three groups of orthogonally oriented angle rate sensors are provided, each group positioned on a different sector of the base, for providing data for each of the x, y, z axes. Three high-G orthogonally oriented accelerometers are also positioned on the base, as well as three low-G orthogonally oriented accelerometers. The unit occupies a volume of less than 2.2 in.$^3$, weighs less than 70 g, and consumes less than 2 W of power.

A processor is positioned on the base having means resident thereon for receiving signals from the three groups of angle rate sensors/gyros and the three high-G and three low-G accelerometers. By "high-G" is meant here ±35 G or higher; "low-G" is intended to mean <4 G. Means are also resident on the processor for calculating one or more of the following: a change in attitude, a change in position, a change in angular rate, a change in velocity, and a change in acceleration of the unit over a plurality of finite time increments.

The calculating means can comprise a near-real-time embedded algorithm suite that has been found to significantly enhance the accuracy of the device over those known in the art.

Preferably, each gyro is made into a precision instrument for stabilizing gyro drift by leveraging factory measurement data provided with each commercial-off-the-shelf (COTS) gyro. These data are used to perform temperature drift and null sensitivity compensation with a fixed-point algorithm operating in the background, which was found to increase sensitivity, lower drift significantly, and stabilize performance. After this compensation, dc offset removal was performed for each gyro to achieve upgraded precision performance including drift stabilization. Individual gyro oversampling was performed. This feature reduces noise and resamples for the follow-on embedded algorithm. In a particular embodiment, the gyros are then combined into orthogonal arrays with the outputs averaged and wavelet-filtered to reduce noise.

The accelerometers are used to measure both high- and low-G acceleration in three dimensions and establish proper alignment of the module sensor suite. Data from these accelerometers are processed by the wavelet denoising algorithm.

A Kalman-filtered bias compensation algorithm is then applied to achieve better than 0.24 deg/h in-run gyro bias stability in all three axes that are implemented with embedded fixed-point computations. The reported results were measured from Allan variance computations of the near-real-time data from several different IMU hardware units and are expected to improve with further development.

Matlab can be used to post-process IMU wavelet-denoised data records in double-precision floating point format. Each of the three orthogonally positioned precision gyro arrays, and their associated processing, achieves less than 0.1 deg/h gyro bias drift, and less than 2 mil angle drift over 5 h duration for the static case based on laboratory testing. The prototype IMU occupies less than 2.2 cubic inches, weighs less than 70 g, and consumes less than 2 W of power. An angle random walk (ARW) of less than 0.4 $deg/h^{1/2}$ on each axis was measured.

Present laboratory measurements for the present IMU's include, but are not intended to be limited to: factory-settable angular range: Model C: ±250 deg/s; Model D: ±1125 deg/s; Allan deviation based in run gyro stability of 0.05 to 0.3 deg/h per gyro channel; rate-integrated angle error measurements of 1.0-2.0 mil over 5 h duration; accelerometer bias stability of 0.07-0.1 mg; 2.2 cu in., 70 g, <2.2 W power from 7-24 V input; optional protected enclosed package design; and near-real-time operation.

The excellent results measured for some gyro channels indicate that further work will produce IMU/INS modules with even better performance. Several new features now form part of the software package. When surface micro-machined sensors are treated not as individual instruments but as arrays of precise instruments, the positioning of the devices in the module, as well as the fusion and filtering mathematics, reduce the inherent silicon noise sources and maximize the individual device performance.

Although the chips from Analog Devices, Inc. (ADI) were selected for this preproduction batch of IMUs, this technique can be applied to any single- or multiple-axis devices. In the pre-production unit fabrication process, no care was taken to pre-select gyro devices to be placed on a specific semi-rigid flex board assembly, or specifically identified to be placed in the positions on the board representative of a specific virtual gyro axis. It is believed that with these selection criteria, the performance of each virtual gyro axis will be optimized to another level of performance.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION

Figures 1, 2:
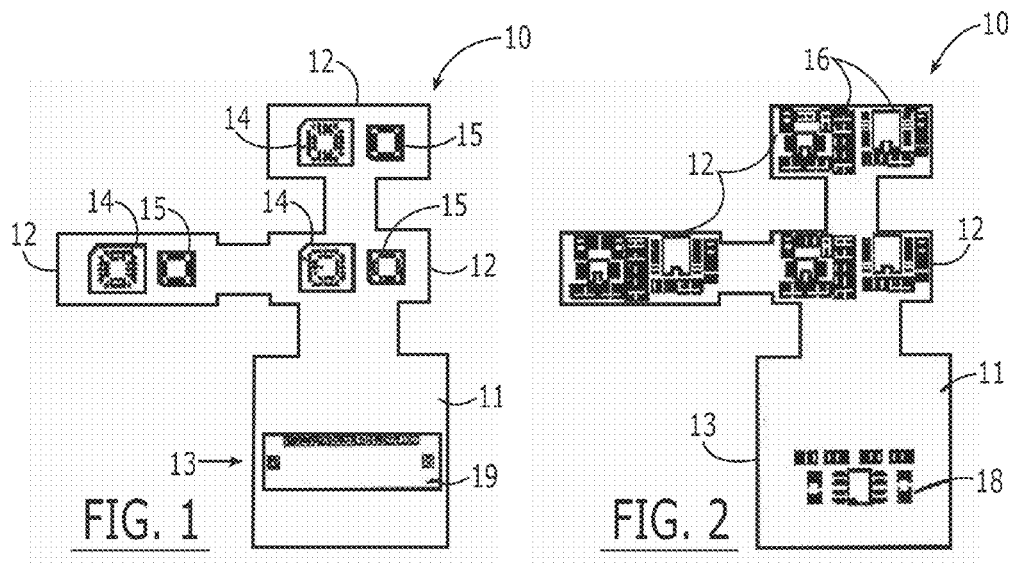
FIG. 1 is a top plan view of a first embodiment of an inertial measurement unit of the present invention, illustrating a four-panel semi-rigid flex board member.
FIG. 2 is a bottom plan view of the flex board member of FIG. 1.

A description of the preferred embodiments of the present invention will now be presented with reference to FIGS. 1-33. This device includes a self-contained, integrated micro-cube-sized IMU in which MEMS gyros and MEMS accelerators provide high-accuracy attitude, azimuth, relative position, and velocity. The semi-rigid flex circuit that forms the base in a particular embodiment can be housed in a protective structure that allows all components (electrical and mechanical) to survive high-G environments with little or no potting and remain precisely aligned in all three dimensions to measure range, pitch, and yaw during movement.

In a first embodiment of an inertial measurement unit 10 of the present invention, a semi-rigid flex board member 11 comprises three panels 12 representing each axis (x, y, and z) and a fourth panel 13. Each of the panels 12 comprises one MEMS gyro sensor element 14, two acceleration sensors 15, and two analog-to-digital converters (ADCs) 16 affixed to the respective panel.

As shown in FIG. 2, the process board member 17 comprises a power conditioning circuit 18 and a micro-connector 19, both of which are affixed to panel 13. The micro-connector 19 comprises both analog and digital data and input ports to initialize all the self-test inputs on all three MEMS gyro sensors 14 and all six MEMS accelerometers 15.

Figure 3:
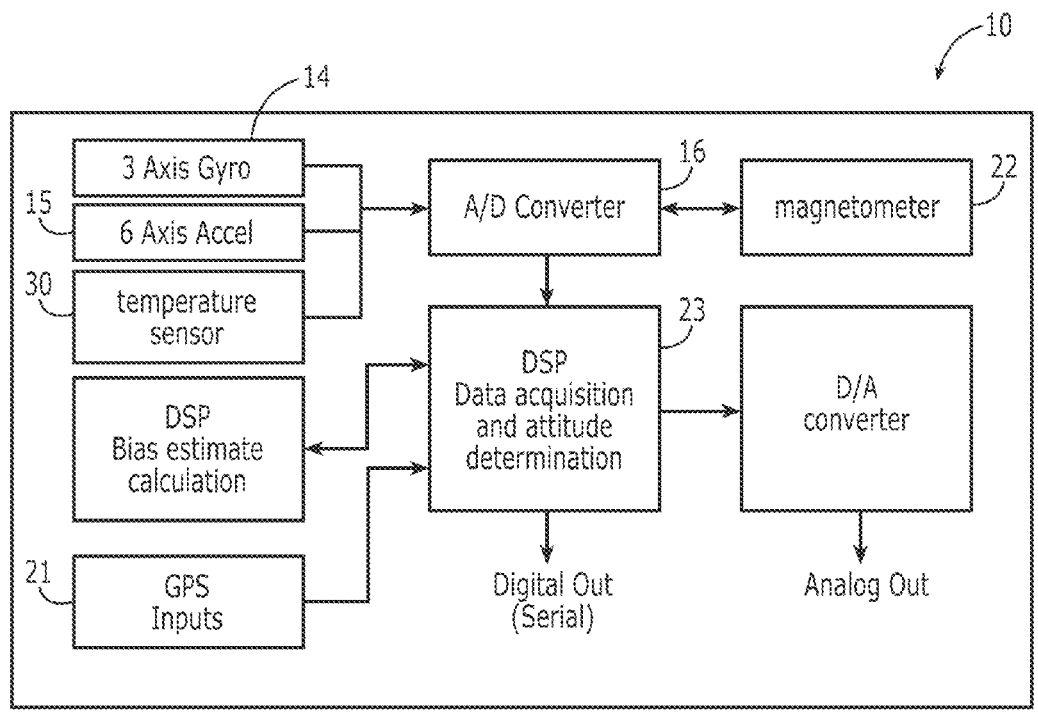
FIG. 3 is a block diagram of the device of FIG. 1.
Figure 4:
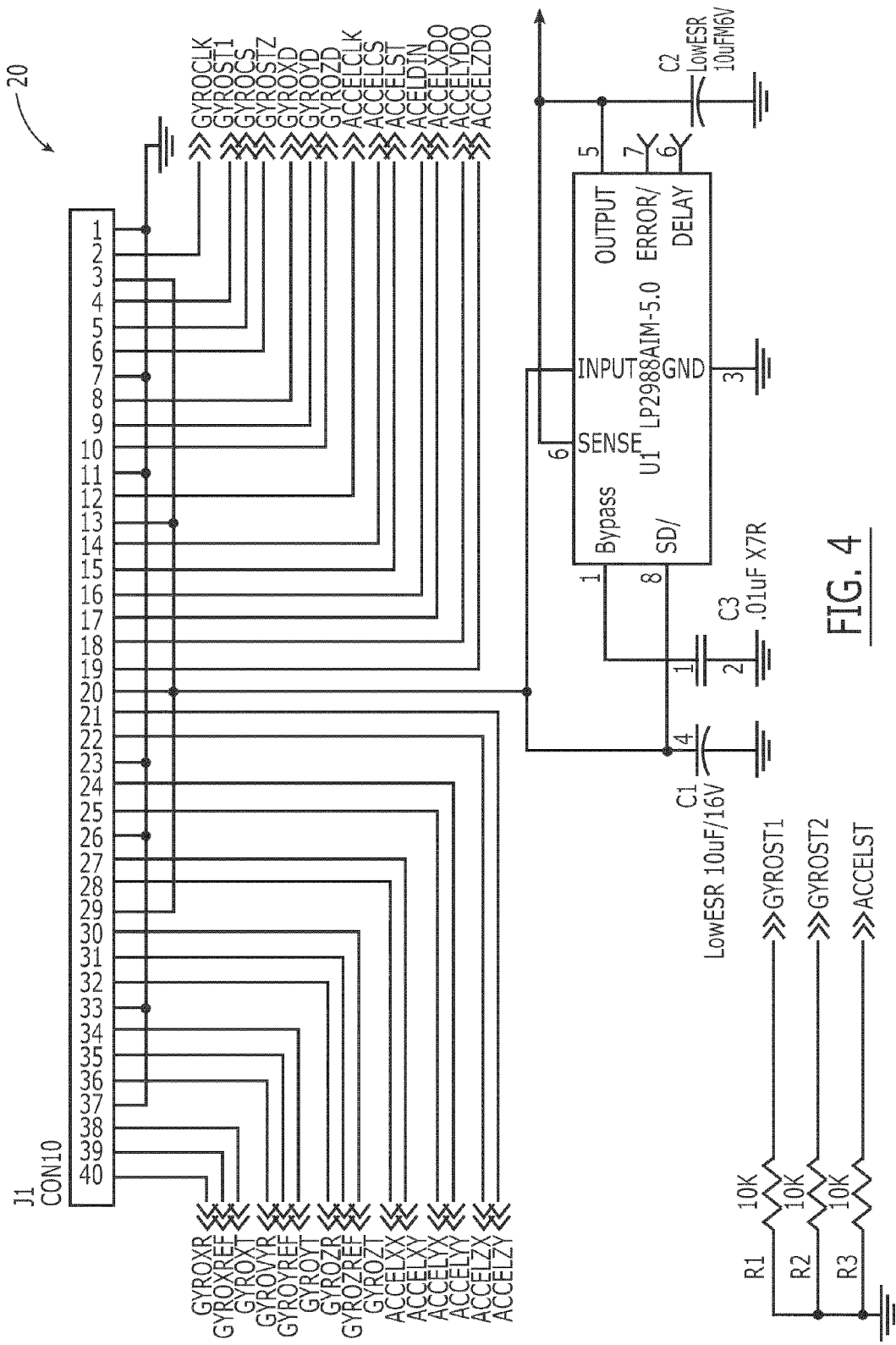
FIG. 4 is an exemplary connector and voltage regulator circuit for the flex board member of FIGS. 2 and 3.

FIG. 3 is a block diagram of the integrated system for the above-described IMU's operating system. FIG. 4 is an exemplary connector and voltage regulator circuit 20 for the flex board member 11. The IMU device's operating system is capable of producing both a digital output and an analog output due to the inclusion of the ADCs 16. The ADCs 16 interface directly to a separate digital signal processor (DSP) board (see FIG. 5) to process the combination of the gyro 14, the accelerometers 15, GPS 21, and magnetometer 22 inputs to be processed as required for the stabilization platform application.

The DSP's 23 embedded software comprises resident sophisticated Kalman filters, GPS, and a navigation algorithm. An objective of using the Kalman filter is to reduce bias associated with both the MEMS gyro sensor 14 and the MEMS accelerator sensor 15. The software features both high-speed internal bus communication and external interface buses to other systems. Serial bus communications may include typical medium-speed RS232 24 as well as high-speed Ethernet links 25.

Figure 5:
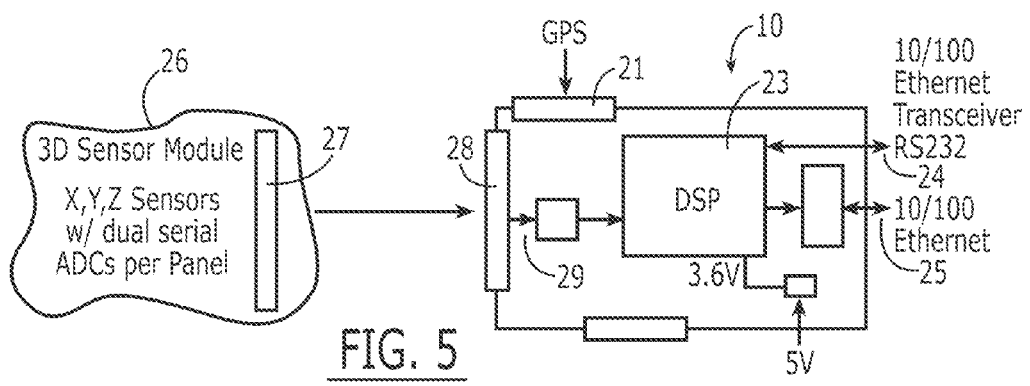
FIG. 5 is an electronics block diagram of the inertial measurement unit of FIG. 1.

FIG. 5 is an electronics block diagram of the inertial measurement unit 10, illustrating the connection between the three-dimensional sensor module 26 and the flex board member 11 via, for example, 40-pin connectors 27,28. A complex programmable logic device (CPLD) 29 combines six serial digital buses into a format compatible with the DSP 23. In a particular embodiment, the device 10 features integrated magnetics, Internet readiness, a laptop GUI controller, and power management, all on a 1.2×1.2-in. board.

Figure 6:
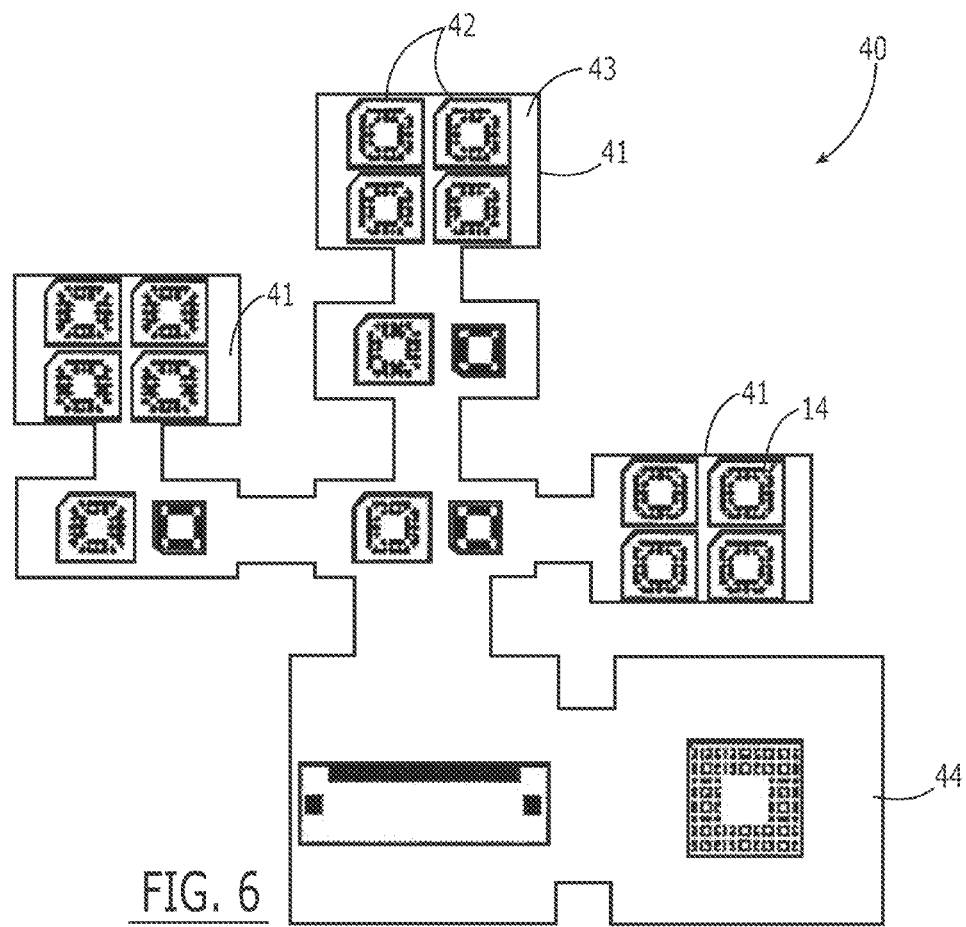
FIG. 6 is a top plan view of another embodiment of the invention wherein the device's sensor module comprises three eight-member arrays of MEMS gyros.

FIG. 6 shows another embodiment 40 of the invention wherein the 3D sensor module member 41 comprises an array 42 of eight MEMS gyros 14 on one of the axis panels 43 instead of the above embodiment of one MEMS gyro element 14 per axis. To further improve the device's performance, four MEMS gyros 14 are mounted on the top side and four gyros 14 are mounted on the bottom side of the selected axis panel 43. The four top-side sensors 14 are arranged around a central point in the selected axis panel 43. Each top side sensor 14 is adjacent two other sensors 14 and oriented at 90 degrees to each adjacent sensor 14. Each bottom side gyro sensor array 42 is oriented such that their sensitive axes are mirror images. One panel contains the DSP 44.

The top and bottom mounted gyro embodiment causes a significant reduction in gravitational-pull-induced noise sensitivity detected by the MEMS gyro sensors. Such a reduction is critical in measuring 3D motion to obtain an angular rate, acceleration, and position data in real time. This embodiment 40 comprising one eight-member gyro array 42 on one panel 43 yielded a noise improvement factor of 2.8. The usage of extended Kalman filter computations further improved the noise performance by a factor of >20.

Figure 8:
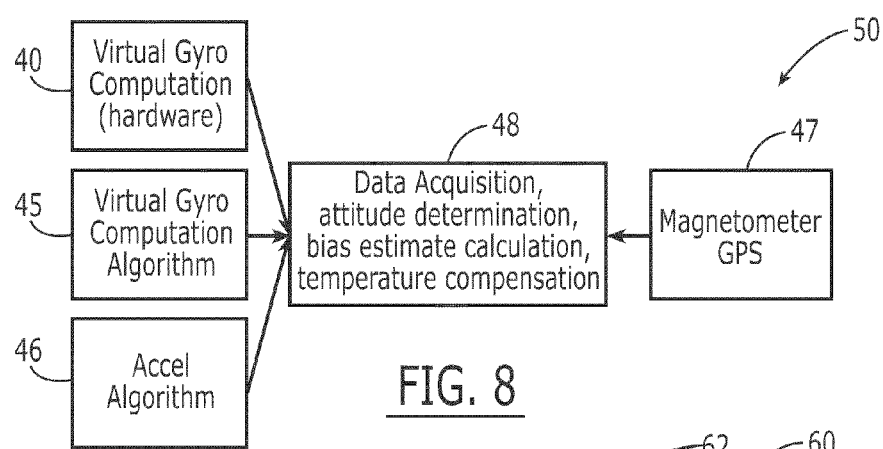
FIG. 8 is a block diagram of exemplary computations that make up the Kalman filter solution through the inclusion of a virtual gyro computation.

FIG. 8 shows another embodiment 50 of the device for achieving further optimization of the IMU's gyro performance. The usage of more than one eight-member array would require that the 3D fully integrated device would have to be made larger to accommodate the additional gyros 14. Moreover, the cost per unit would increase and there would be less protection from high shock transients. Substituting the eight-member gyro array 42 described above in one of the axis panels 43 and then using virtual gyro algorithms further enhances the beneficial effect provided by the sole array. The substitution of an eight-member gyro array 42 for one of the single MEMS gyros 14 located on one of the panels 43 coupled with an enhanced Kalman filter and virtual gyro algorithm 45 is a unique approach to cost effectively optimize the performance of the micro-MEMS IMU. To achieve this effect, a virtual gyro algorithm 45 is combined in a multistage Kalman filter solution for providing an improved solution for gyro performance and hence IMU performance.

FIG. 8 includes the algorithm sections that make up the Kalman filter solution. The hardware layout scheme to achieve "virtual gyro-hardware" as described above is used to reduce the drift and dc errors of the MEMS gyros by combining groups of four on each side of the board layout to reduce these errors significantly either by analog summation techniques before digitization or direct digitization of all the gyros and digital processing, including summation and filtering.

The "virtual gyro" algorithm techniques are used to extend performance. Here, an optimal filter combines and smoothes multiple gyro measurements to produce a minimum-variance rate estimate. This rate estimate is denoted as a "virtual gyro" since it is indistinguishable from an actual rate measurement taken from a single physical gyro having improved performance. A 1-2 order of magnitude improvement in drift is achieved, enabling the achievement of tactical-grade performance and usefulness of the device in a wider range of applications than currently available.

The other sensor inputs are also combined in the Kalman filter, that is, accelerometers 46 and GPS 21, temperature sensor 30, and magnetometer 47 data, to compute an improved solution.

The virtual gyro algorithm processes the outputs of multiple gyroscopes to increase the accuracy of rate (that is, angular velocity) readings. This method is intended especially for application to gyroscopes that are parts of microelectromechanical systems (MEMS). The method is based on the concept that the collective performance of multiple, relatively inexpensive, nominally identical devices can be better than that of one of the devices considered by itself. This method makes it possible to synthesize the readings of a single, more accurate gyroscope (a "virtual gyroscope") from the outputs of a large number of microscopic. A 27-stage Kalman filter was created as part of a statistical analysis effort to determine how good the virtual gyro and accelerometers could be in a GPS-based Kalman filter solution for UAV flight profiles. This analysis provided results that favor the virtual gyro approach. For this solution (FIG. 8), the navigation system algorithm solution comprises three components: the IMUs provide raw accelerations and rotations in body frame (gyro sensors); the pure inertial navigation system resolves the inertial measurements in navigation frame and updates the attitude, heading, velocity and position of the module; and the Kalman filter 48 integrates the measurement of the pure inertial system with the measurement of external sensors to provide corrections to inertial system errors.

For the "virtual gyro" solution, the attitude reference 27-stage Kalman filter is enhanced to process the virtual algorithm solution from the array of gyros placed in the hardware (virtual gyro-hardware) to reduce dc errors as well as process the virtual gyros that are presented as independent gyro inputs digitized and input to the Kalman filter for processing. By taking advantage of both the hardware and algorithm improvements, performance improvements are achieved using off-the-shelf MEMS devices.

The attitude determination algorithm is divided into two separate entities. Gyro-measured angular rate information is integrated in time in the attitude processor. If the initial attitude of the vehicle were known, and if the gyros provided perfect readings, then the attitude processor would suffice. However, the initial attitude is seldom known, and gyros typically provide imprecise data due to bias drift and turn-on instability. Both gyros and accelerometers have bias and bias drift terms and suffer from misalignment errors, acceleration errors (G-sensitive), nonlinear (square term), and scale factor errors. The largest error is typically associated with the bias terms. Without a filter structure and separate independent measurements, the attitude processor would diverge from the true trajectory. The Kalman filter attitude correction component therefore provides an on-the-fly calibration by providing corrections to the attitude processor trajectory and a characterization of the gyro bias state. The accelerometers provide an attitude reference using gravity. A 27-stage Kalman filter simulation study has shown good results and is the basis for this approach.

A known method of virtual gyro computation uses a method of combining and filtering the digitized outputs of multiple gyroscopes to obtain minimum-variance estimates of rate. In the combining-and-filtering operations, measurement data from the gyroscopes are weighted and smoothed with respect to each other according to the gain matrix of a minimum-variance filter. Since it is well known that errors for multiple gyros behave in predictable ways, the minimum-variance gain matrix is analyzed and a simple algebraic method developed for computing the optimal gain matrix.

For statistically independent gyros, it has been shown that component drifts add like parallel resistors in terms of their variances (e.g., in units of $rad^2/sec^3$). For example, the drift of a virtual gyro composed of N independent and identical devices will be 1/N of the individual device variance (e.g., like N resistors R in parallel having overall resistance R/N). Note that this corresponds to $1/N^{1/2}$ of the individual device drift in units of $rad/sec^{3/2}$.

Any individual device with a large drift will not count much in the overall performance (like a large resistor in parallel, which can usually be removed from consideration). Any device having drift significantly less than the other devices will dominate the performance of the virtual gyro (like a small resistance in parallel).

Figure 7:
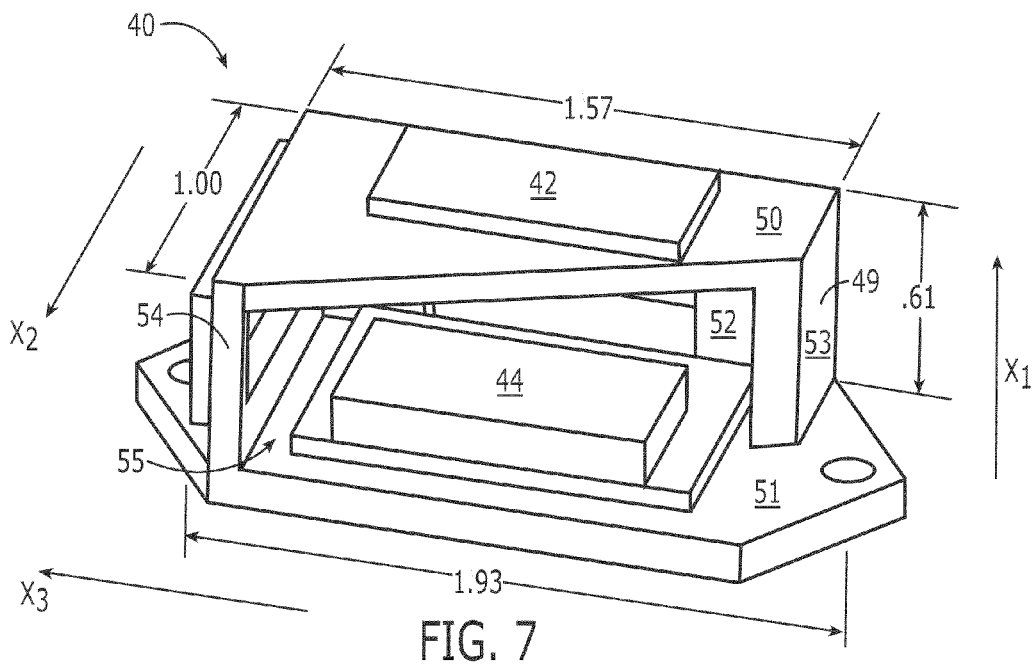
FIG. 7 is a perspective view of a support member for the device of FIG. 1.

Referring to FIG. 7, one embodiment of a fully assembled device 40 comprises a miniature 3D structure comprising the operating system member 44 and a metal support member 49 wherein the operating system member 44 is protected from shock and high-G environments. The metal support member comprises a four-sided rectangular cube having a top 50, bottom 51, back 52, and right 53 and left 54 sides. A rectangular portion is cut from each side to provide four rectangular cut-outs 55.

Assembly is achieved by placing the flex board member within the metal support member 49 with flex board panel positioned against the bottom 51 and then fitting all four panels into their respective adjacent rectangular cut-out 55. The properly oriented panels are then bonded into place.

The above two embodiments 10,40 do not specifically refer to the inclusion of a magnetometer in the device, although FIG. 3 shows that the device can include a magnetometer input 22. Any magnetometer 22 should be mounted outside the metal support member to avoid interference of magnetic measurements by the magnetometer and can be mounted under the bottom 51 of the device 40 depicted in FIG. 7.

Figure 9:
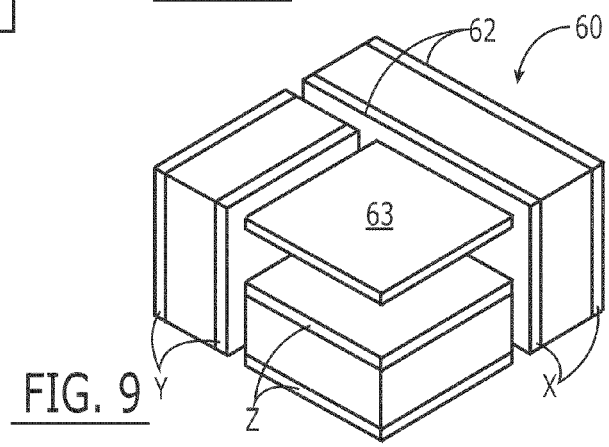
FIG. 9 is an alternate mechanical frame.
Figure 10:
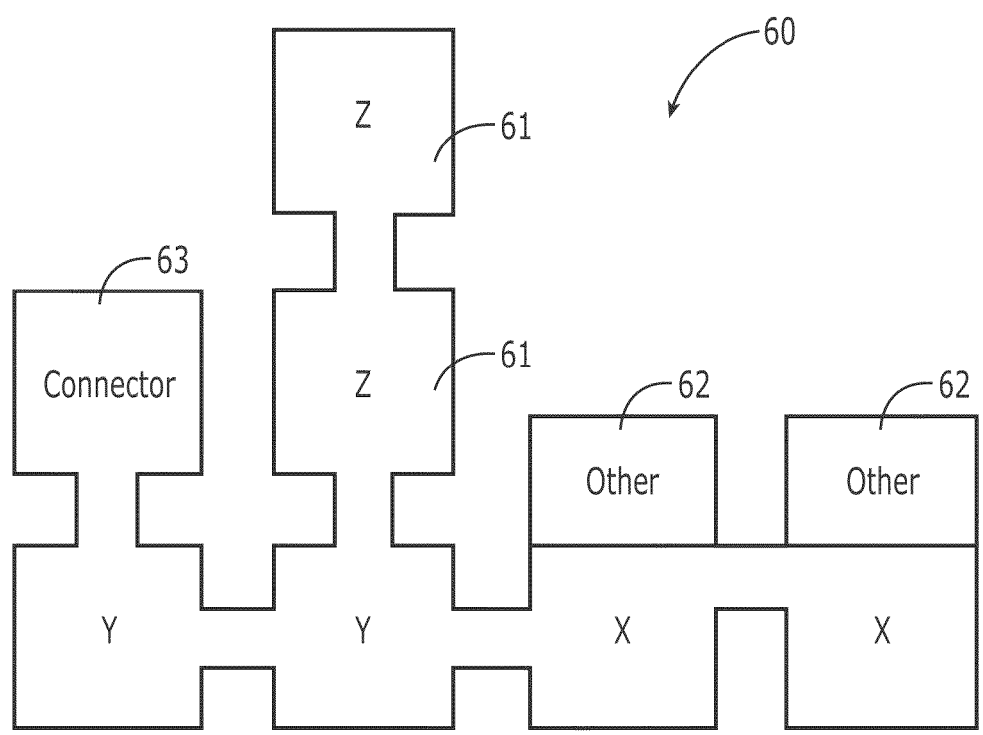
FIG. 10 is a top plan view of another flex circuit for a 3D virtual gyro/accelerometer system.

The mechanical configuration need not be in the frame design described. To accommodate other designs requiring more panels, an alternate configuration 60 is shown in FIG. 10. The modules are then folded as shown in FIG. 9. In FIG. 10, two panels 61 per axis are used to house the multiple gyros (virtual gyros) and the multiple ADCs needed to digitize all the inputs and process them in the DSP in the panels 62 marked "Other." More than eight gyros per axis can be accommodated using multiple panels per axis. Note that substantially all the volume is used, which is the reason for the two X boards being longer than the others. The total volume may be as small as approximately 1.41 $in^3$. The connector 63 is used to both program and load the code into the DSP as well as read out the IMU performance parameters. The entire assembly may be potted for ruggedness, only allowing the top surface (to which the connector is mounted) free. An internal fixture can hold the modules square during potting.

Figure 11:
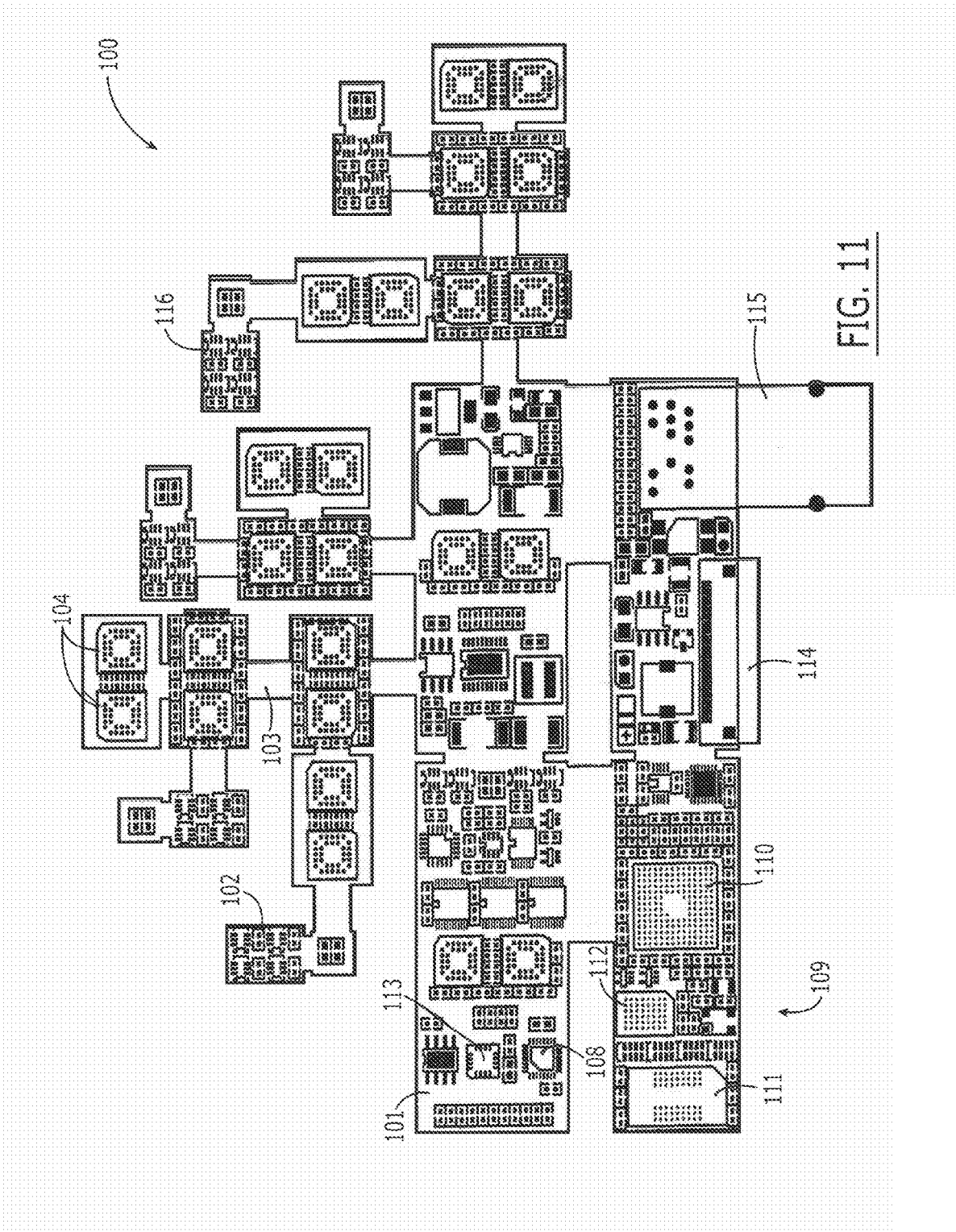
FIG. 11 is a top plan view of another embodiment of an inertial measurement unit of the present invention.

Another embodiment 100 of the present invention is illustrated in FIGS. 11-19. This embodiment of an inertial measurement unit can provide near-navigation-grade performance with commercially available off-the-shelf components. FIG. 11 is a top plan view of a semi-rigid flex board layout of the device, illustrating the active components positioned on a unitary, substantially planar base 101. The base 101 comprises a plurality of sectors, each sector comprising a PCB panel 102 linked together with flexible connectors 103, the panels 102 foldable relative to each other. In the embodiment shown, there are 24 panels 102. The arrangement confers shock-hardening to the structure, in excess of 20,000 Gs.

This embodiment 100 comprises a total of eight gyros 104 per axis, for a total of 24, positioned two to a panel 102. Preferably the gyros 104 comprise micro-electro-mechanical system (MEMS) gyros, although this is not intended as a limitation, with exemplary devices comprising Analog Devices ADXL610 MEMS gyros, and it is believed that nanoscale devices are also usable for the present application.

Figure 12:
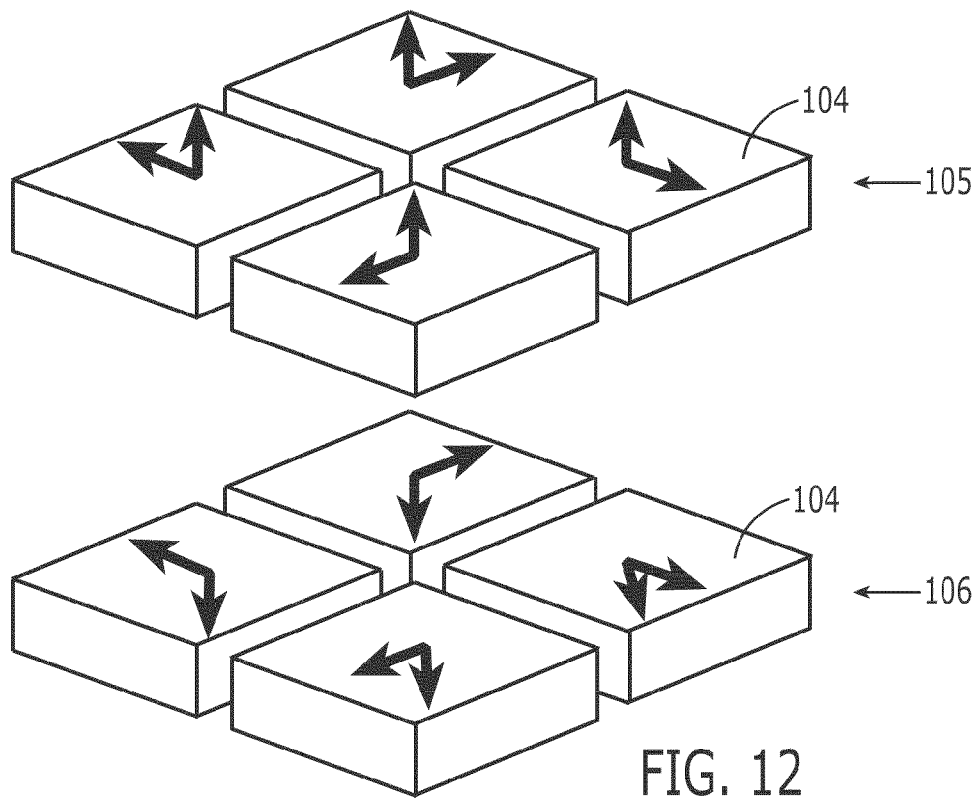
FIG. 12 illustrates the gyro layout for achieving error cancellation.

When folded, the panels 102 achieve an orientational layout as depicted schematically in FIG. 12. Here, N=4 gyroscopes 104 are oriented at 360/N-degree (i.e., 90°) increments in the top set 105 in a first direction, and another set of N=4 gyroscopes 104 are oriented at 90° increments in the bottom set 106, positioned in a second direction opposite the first direction (i.e., inverted, or "upside down"). This orientational layout is repeated to achieve the same structure for all three x, y, z axes, and has been shown to reduce dc error terms, specifically G and $G^2$ drift errors, by forming a "virtual gyro." In a particular embodiment, the panel 102 holding one set of four gyros 104 is positioned atop and inverted relative to its companion panel 102 of four gyros 104.

Also positioned on the base 101 is at least one triaxial accelerometer 107. Similarly to the virtual gyro as described above, a virtual accelerometer array can be formed using multiple triaxial devices or multiple individual accelerometers to form an array, each of the devices positioned in 90° increments. An exemplary accelerometer 107 usable for the present application comprises an Analog Devices ADXL330 device, which comprises a small, thin, low-power complete three-axis accelerometer with signal-conditioned voltage outputs on a unitary, monolithic integrated circuit. This device measures acceleration with a full-scale range of ±4 G. The typical noise floor is 170 µG/root Hz for x and y axes, and 350 µG/root Hz for z axis, allowing signals below 3 mG to be resolved in tilt-sensing applications using narrow bandwidths between 0.5 and 60 Hz. The output temperature sensitivity or change between ambient and either maximum or minimum temperature is 0.01%/° C., while the zero offset G errors with temperature vary only 1 mG/° C.

The array can comprise devices arranged in an active x-y plane with a z plane through the top of each chip 107. Another array turned upside down is then formed similarly, again with a minimum of four devices. This layout also reduces dc error terms by canceling errors common to the individual sensors. Such a "virtual sensor" arrangement achieves improved accuracy to reach an accuracy of 1 milliradian in the azimuth orientation.

A three-axis magnetometer (magnetic sensor) 108 is also positioned on the base 101 for reporting true north and also for eliminating local magnetic anomalies and effects.

Temperature sensors 121 in a particular embodiment are part of each of the gyros 104 and accelerometer 107. The temperature sensors 121 sense temperature and compensate for changes outside the normal gyro and accelerometer ranges.

A processor 109 is also affixed to the base 101 and, in a preferred embodiment, comprises a digital signal processor (DSP) 110 that is capable of adapting to computational load to reduce current consumption and minimize power usage. Support is provided by a 32-MB SDRAM 111, a 3-MB flash 112, and a 128-kB EEPROM 113 device. A 40-pin connector 114 having a plurality of buses is affixed to the base 101, as are integrated magnetics and a J45 connector 115. The buses can include, for example, CAN, UART, Ethernet, SPORT, SPI, and JTAG communications, although this is not intended as a limitation. External power can be provided by two ports, including, but not intended to be limited to, 5.5 V dc and/or 7.0-24 V dc. Alternatively, the unit 100 can be powered by a power-over-Ethernet (POE) connection. Electrical conversion is provided by analog-to-digital devices 116 in communication with the gyros 104.

Figure 13:
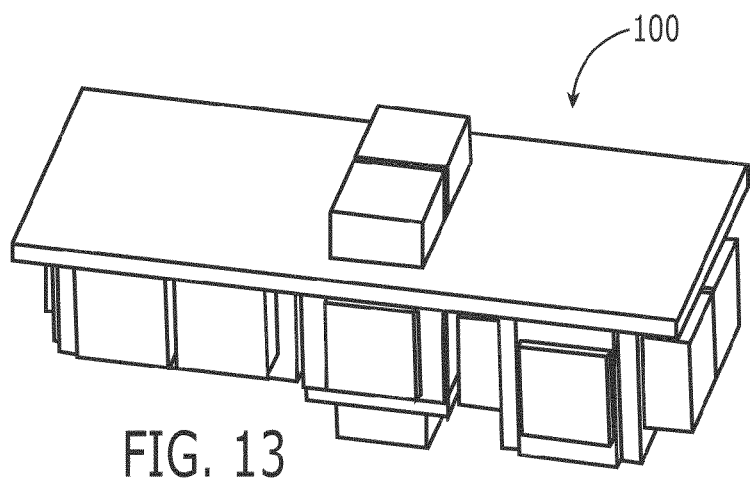
FIG. 13 is a top-side perspective view of the folded device.

The elements of the device 100 are contained in a structure that, when folded, has a volume less than 1.9 in$^3$. An exemplary layout is depicted in FIG. 13, which shows the panels 102 folded to form a three-dimensional structure having the dimensions 2.2×1.012×0.83 in. The structure achieves the necessary alignment by a two-step fabrication and assembly process. In the first step, the single-sided flex circuit is folded, bonded to an internal structural element, and potted to form a flex circuit with three gyro modules. In this process a fixture may be used to align the gyros in each direction with one another.

In the second step, the alignment of one gyro module to the others is achieved, in which a second internal structure holds the modules square to one another to a great degree of precision.

In another embodiment of the fabrication process, the gyros can be aligned grossly upon mechanical assembly, and adjustments made with software processes. In this method the assembly is placed on a rotating table, and the output of each individual gyro is examined. Any output of an off-axis gyro is deemed due to misalignment and the misalignment angle inferred. The misalignment can then be corrected by performing vector processing on the array of device outputs.

FIGS. 20-25 schematically illustrate steps in achieving final assembly, which requires a populated flex circuit, three gyro mounting tubes, double-back tape, adhesive, potting material, several fixtures, and a mold. One of skill in the art will recognize that other fabrication processes may be envisioned, and the particular steps in preparing the device are not intended to be limiting.

In a particular embodiment, the flex circuit 200 comprises 24 boards 201-224 arranged in 12 pairs (FIG. 20), connected with flexible connector material 225 as shown. The tape is cut to obtain 12 matching pieces. The tape is applied to the second of each pair and the release paper removed, and the second board is folded over and onto the first, as shown by the arrows. Then the second board is aligned to the first using a fixture. This step is repeated for each of the remaining pairs.

Figure 20:
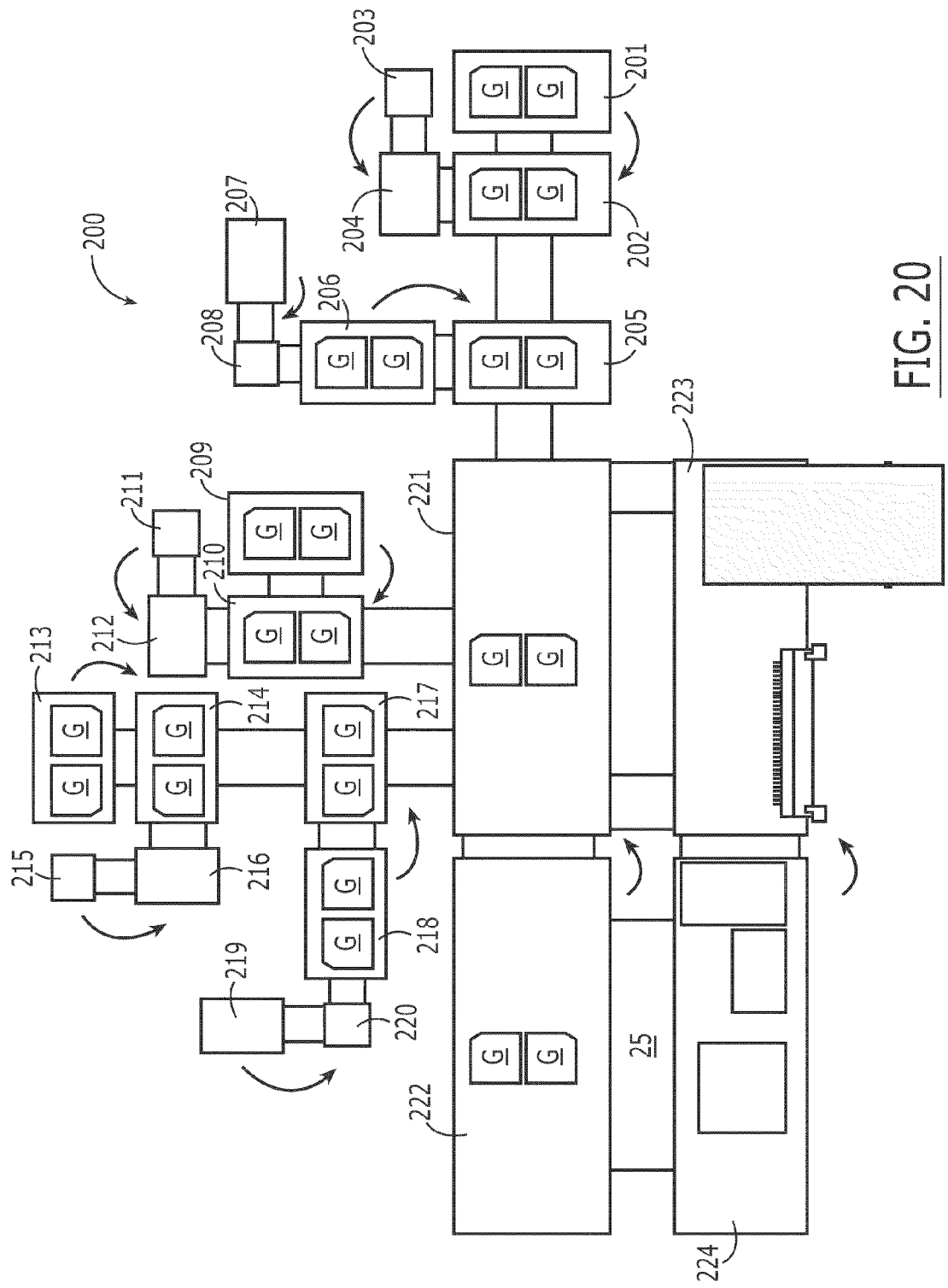
FIGS. 20-25 illustrate schematically the assembly of a flex board.
Figure 21:
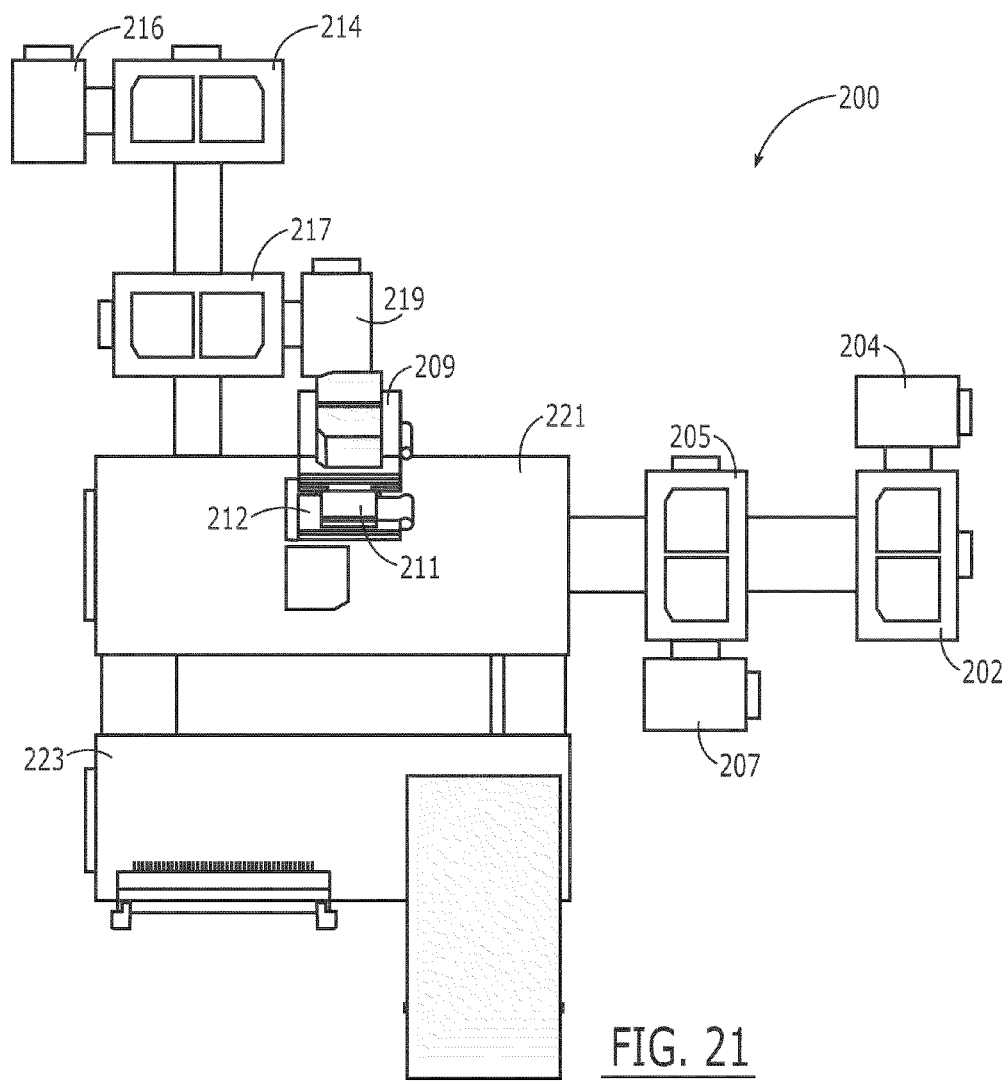

In order to illustrate this for one of the sets of circuit boards, refer to the set of circuit boards 201-204 in FIG. 20. Board 201 is folded under board 202 so that the respective gyros G mounted thereon are on the outsides of a formed "sandwich." Board 203 is folded under board 204 to form another layered structure. This is repeated for the other four similar sets of boards 205-208, 209-212, 213-216, 217-220. The other four gyros G to make up the sixth set are on boards 221, 222, which are also folded together with board 222 beneath board 221. The other two boards 223, 224 are also folded with board 224 folded under board 223. Boards 222,224 and 221,223 are also connected together with flexible connector material 225. The result of these steps is shown in FIG. 21.

Figure 22:
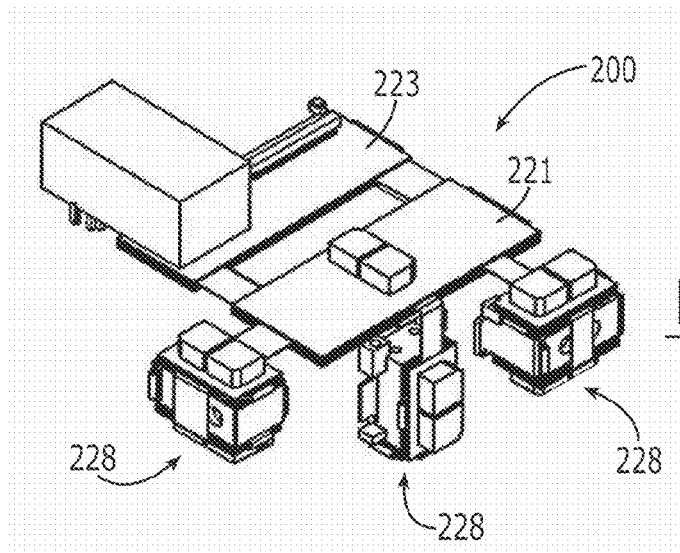

Next the gyro modules are assembled. Using the appropriate fixture and mounting tube, the gyro and support boards are wrapped around, as shown for boards 209-212 in FIG. 21. Here, board 210 is in position beneath board 209. Next each of the assembled gyro units, as shown in folded configuration in FIG. 22, is folded onto board 221, as shown in process in FIG. 23, wherein gyro unit 209-212 is positioned atop board 221, as in FIG. 21. Note that the remaining gyro set on boards 221,222 are positioned "upside down" from each other owing to the folding of the boards on which they reside, and that the gyros G on board 221 are surrounded by the unit formed by boards 209-212.

Figure 24:
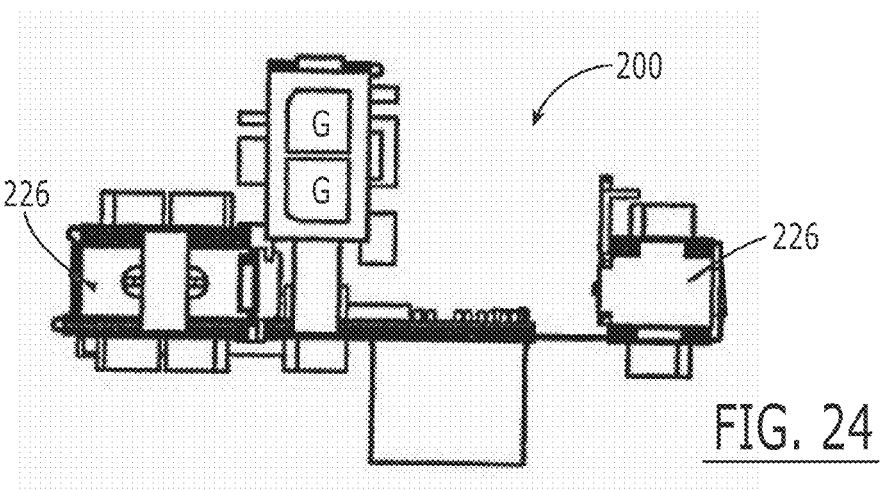

Next the gyro units are bonded to the appropriate mounting tube 226 (FIG. 24). The purpose of the fixture 226, which may comprise, for example, a generally rectangular box-like structure, is to align the gyro boards to one another. The interior of the gyro modules is potted by injecting potting material through holes in the tubes 226. These steps are repeated for the other two modules.

Figure 23:
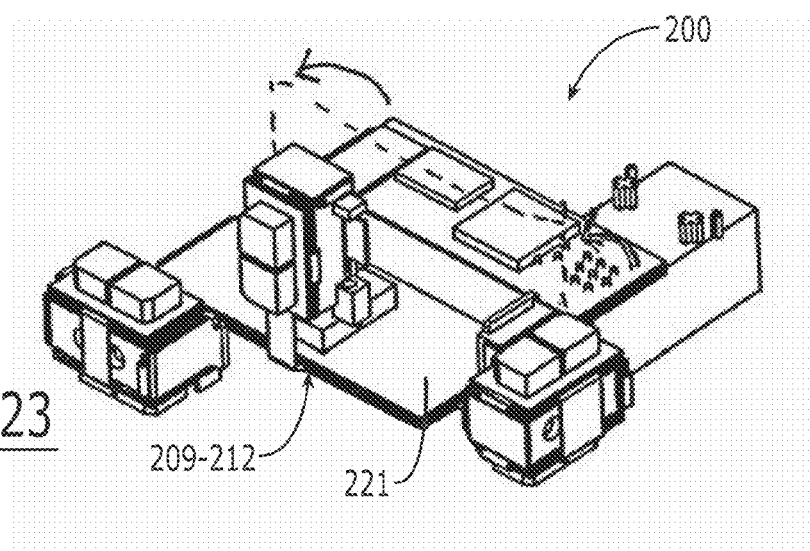

The final fold up proceeds by folding a side module that comprises boards 223,224 into an approximate position normal to boards 221,222, as shown by the dotted lines and arrows in FIG. 23. A tab on the side module 223,224 is slipped into a slot in the center module. The tab is moved down the slot, thereby engaging the hook on the tab. A setscrew is tightened, thereby fastening the side module into position relative to the center module 221,222. These steps are repeated for the other side module.

Figure 25:
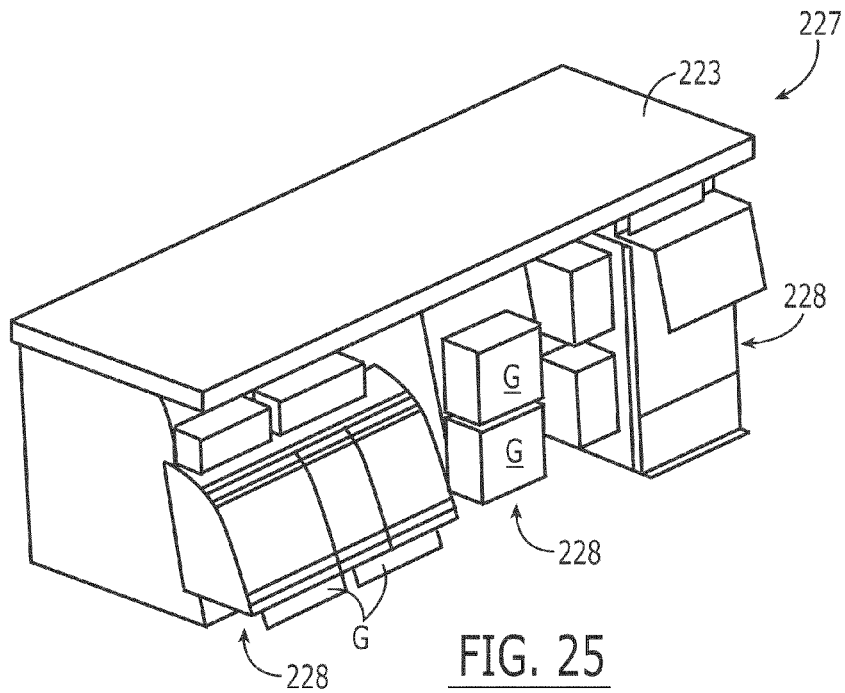

The assembly 227 shown in FIG. 25 is then placed into a mold and the mold filled with potting material.

The computational portion of the invention is shown in block diagram form in FIGS. 14-17, in which optimum performance is achieved by the integration of the sensor arrays to correct bias errors inherent in MEMS technology using "virtual sensor" technology. As discussed above, each axis contains eight gyros 104, a single MEMS triaxial accelerometer 107, and three micro-packaged analog-to-digital (ADC) converter devices 116 that integrate with the processor 109 bus in a manner believed optimum to reduce analog errors and execute the algorithms in the DSP 110. Temperature compensation is implemented in the DSP 110 as well.

Figure 14:
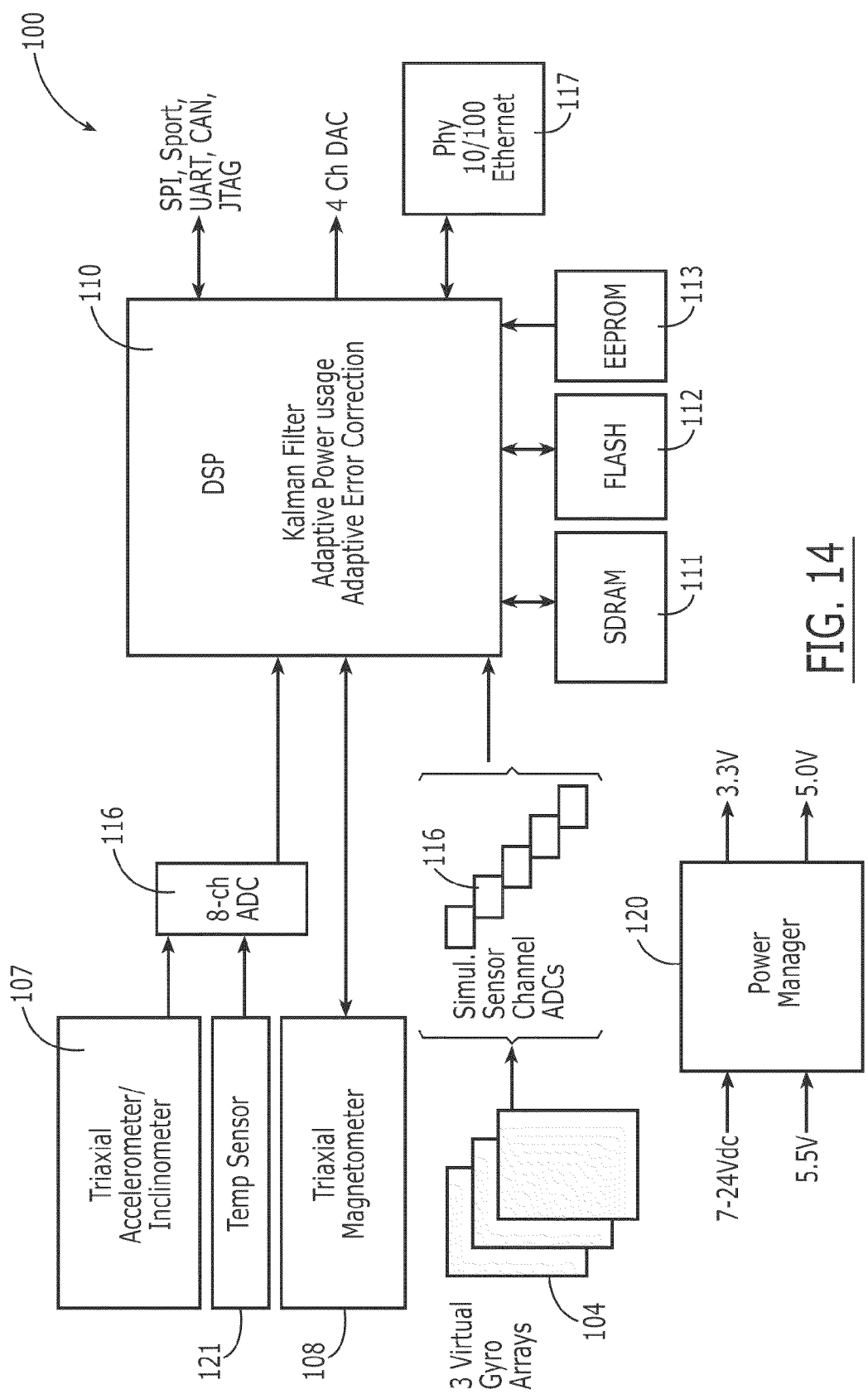
FIG. 14 is an exemplary electronics layout of the device of FIG. 11.
Figure 15:
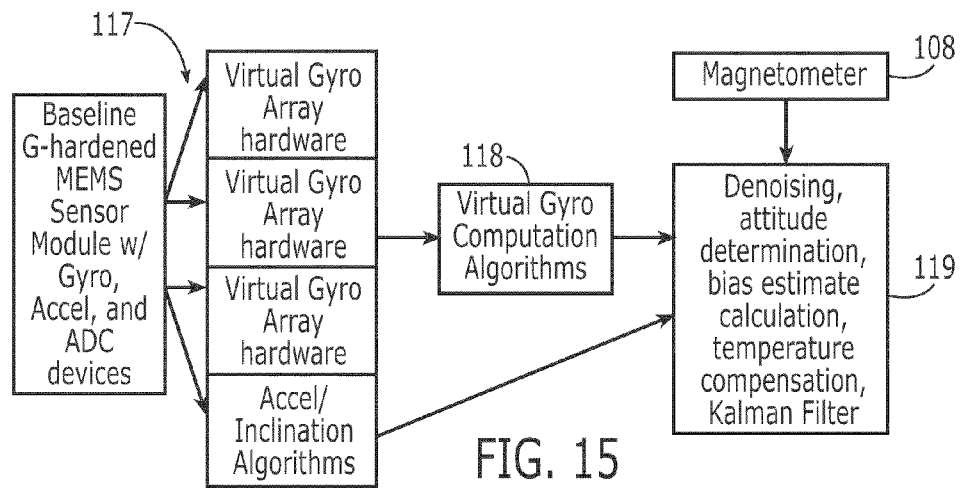
FIG. 15 is an overview flow diagram of the algorithms performed in the DSP.

An exemplary electronics layout is given in FIG. 14. Several output bus options are available, including, but not intended to be limited to, RS232 and 10/100 Ethernet 117. Either bus can be used to download and run real-time code in the DSP 110. The software can implement the algorithm in fixed-point, block floating, or floating-point notation. The power manager circuit 120 creates regulated 3.3- and 5-volt inputs to all internal circuitry requiring either or both dc voltages.

Exemplary computation methods will now be discussed with reference to FIGS. 14-19. An overview flow diagram of the algorithm is given in FIG. 15, wherein output 117 from the sensors 104,107 in an array are subjected to the virtual gyro computation algorithms 118 of the present invention. The resulting data and magnetometer input are then processed 119 by a denoising algorithm, attitude determination, bias estimate calculation, temperature compensation, and a Kalman filter 123.

More detail on the computations of the present invention will now be discussed with reference to FIGS. 16-19, the computations designed to improve accuracy by reducing inherent errors in the hardware and output thereof. There are several sources of error in inertial measurement units (IMUs). To obtain position, one triaxial accelerometer can measure the total acceleration vector of a body relative to inertial space. This acceleration vector can be converted from body coordinates to earth coordinates using the known instantaneous orientation of the body determined by the gyros. Position is then obtained by subtracting off the effect of gravity from the measured acceleration and then performing double integration starting from a known inertial position. Drift in the determination of orientation results mostly from gyro biases, defined as the output produced by a gyro at rest. Fixed biases, if uncompensated, lead to a constant rate of drift after integration. The most important issue, however, is bias stability. MEMS gyros have drift rates ranging from several degrees per hour to a degree per second.

Accelerometer instrument errors also occur, such as bias stability, scale factor stability, nonlinearity, and misalignment. Tactical-grade accelerometers must keep these errors to a few micro-G. Since position is obtained by double integration of acceleration, a fixed accelerometer bias error results in a position drift error, which grows quadradically in time. It is therefore critical to accurately estimate and eliminate persistent bias errors.

Another cause of error in position measurement is error in the orientation determined by the gyros. Since the device interprets the direction of the measured acceleration according to the computed orientation of the platform, any error in this computed orientation causes it to integrate the accelerometers in the wrong direction, thus deviating slightly from the true course of the vehicle. The cancellation of gravity is performed imperfectly in the DSP, causing a horizontal acceleration, that is, an error in angle, to be erroneously added to the earth-frame acceleration vector. Thus the pitch and roll accuracy must be better than 0.005 degrees for the duration of a flight, which sets a more difficult standard for the gyros than the accelerometers.

Figure 16:
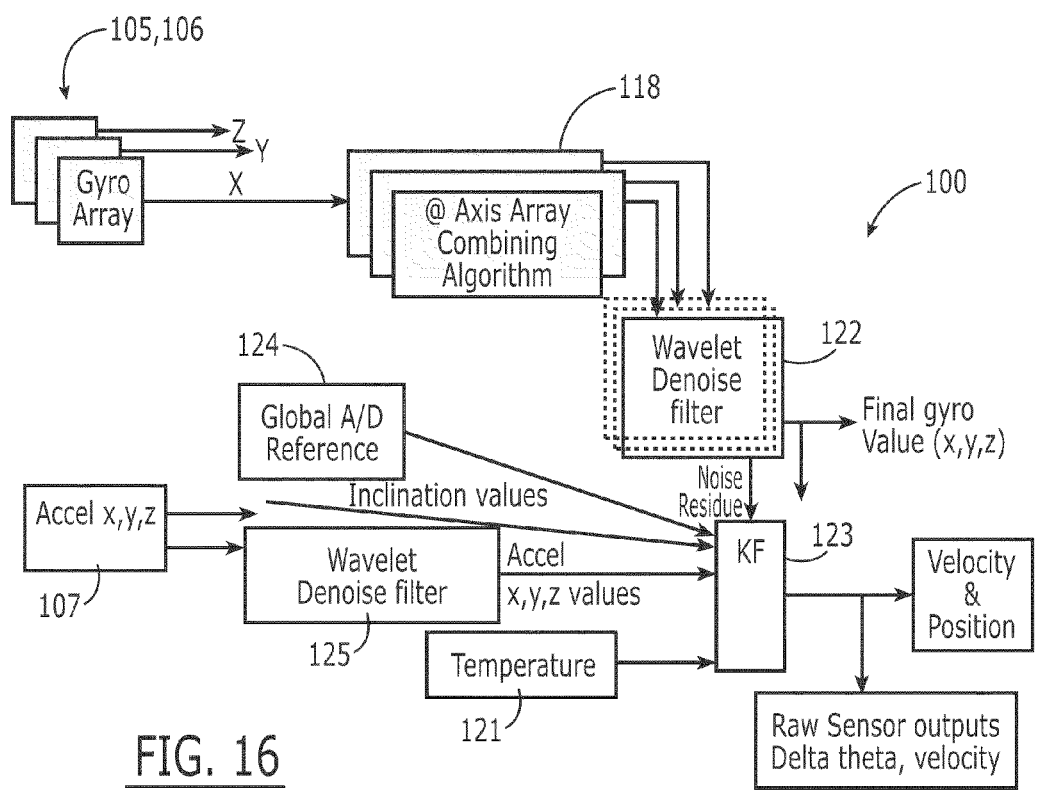
FIG. 16 is a block diagram of the algorithm flow for the inertial measurement unit of the present invention.
Figure 17:
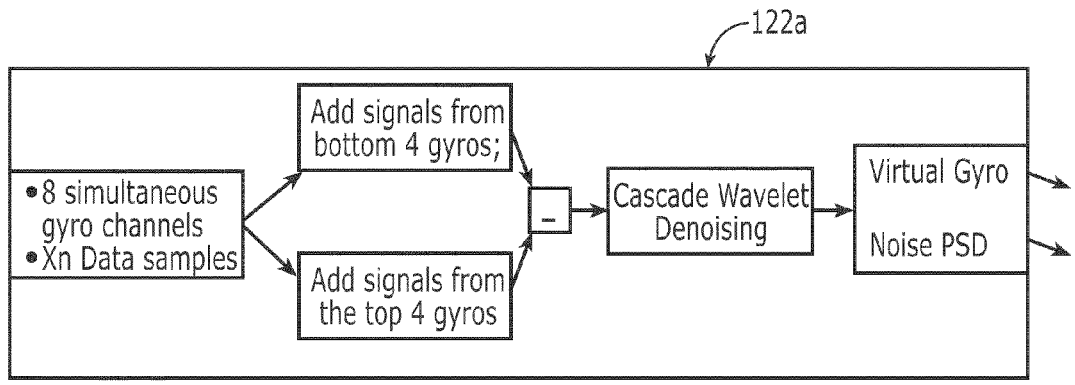
FIGS. 17 and 18 are flowcharts for two alternative methods for correcting bias errors.
Figure 18:
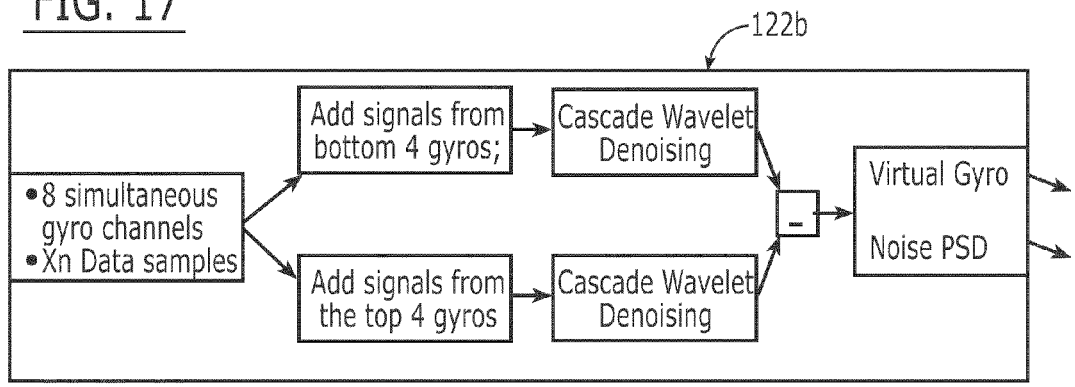

The hardware and software of the present invention significantly improve the performance of a single gyro per axis by combining multiple devices using both hardware alignment techniques and a combination of algorithms processed in the embedded DSP (FIG. 16). Here the data from the gyro array 105,106, containing x, y, z information, are sent to an array-combining algorithm 118, and thence to a wavelet denoising filter 122. The wavelet-based cascade denoising filter 122 is used to improve the sensors' signal-to-noise ratios and to remove sensor errors mixed with motion dynamics. It reconstructs the gyro signals with improved signal-to-noise ratio in one channel while providing the variance characteristics of the noise in a second channel, both for further processing by a Kalman filter (KF) 123. The Kalman filter 123 also receives input from a global A/D reference 124, a temperature sensor 121, and accelerometer 107 by way of a wavelet denoising filter 125.

The proposed method has been applied to a MEMS-based IMU containing an array of Analog Devices MEMS gyroscopes and an ADI triaxial MEMS accelerometer. Previous results using single gyros and accelerometer devices per axis have shown that an enhancement in positioning accuracy by at least 50% during GPS outages can be obtained by applying a specific type of wavelet filter, thus reaching positioning accuracy levels equivalent to those of some of the current tactical-grade systems but at a much lower cost.

Several different forms of wavelet denoising algorithms have been evaluated for this application. The cascade wavelet denoising algorithm has been selected because the number of cascade levels can be used to control both the amount of noise reduction and the amount of real signal content that is allowed to be recovered during the filter process.

To take advantage of the denoising algorithms 122 for gyro arrays, two exemplary arrangements (FIGS. 17 and 18) have been described for each axis. Although any of the conventional denoising, the cascade denoising solution, or the array denoising solution can be selected, the cascade solution has slightly more performance and control and at the expense of more computational requirements than the conventional version, but less computational requirements than the array version. The final arrangement can be dependent on the computational capacity of the processor, since one approach uses twice as many wavelet algorithm computations as the other. For the hardware implementation, the cascade algorithm has been selected to maintain better control of the final angular rate sensor outputs.

One embodiment of the algorithm includes summing the top four gyros, summing the bottom four gyros, and subtracting one summed signal from the other summed signal. The denoising algorithm is applied after the mathematical sequence. In another embodiment of the algorithm, two denoising algorithms are used, one on each summed array. Then one denoised summed array is subtracted from the other.

Two different forms of wavelet denoising algorithms 122$a$, 122$b$ are described for denoising the array of gyros in each axis. One is referred to as conventional denoising, and the other is a modification called the cascade algorithm. Both algorithms basically perform the wavelet transform, threshold the transform coefficients, and perform the inverse transform. The cascade algorithm has a slightly different threshold from the conventional case, and some additional low-pass filtering. In both algorithms the wavelet transform is initially performed. A matrix is created that represents the wavelet transform, and the matrix is multiplied by the input signal. This matrix method is an efficient approach and works well. However, the matrix needed is N×N, where N is the length of the input signal. Therefore, this approach might use excessive memory if long input signals are used. If memory is an issue, the wavelet transform can be computed using a different approach such as with filtering commands. Both algorithms are restricted to performing five levels of the wavelet transform.

In the conventional denoising approach, noise is assumed to be additive white Gaussian. The variance of the noise is estimated from the median value of the wavelet coefficients at the first scale. Then, a threshold is determined that is based on normalizing the noise distribution. There are documents in the literature on how to choose the best threshold, or identify noisy coefficients. Regardless of how the wavelet coefficients are thresholded, the inverse wavelet transform is then performed, and the resulting signal is the denoised signal. The largest difference between the cascade and conventional algorithm is that the cascade algorithm low-pass filters the data with wavelet filters before thresholding. This method is implemented using the following approach. After the wavelet transform is calculated and thresholded as in the conventional case, wavelet coefficients in the first L levels are set to zero before the inverse transform is performed. In addition, the cascade algorithm uses a slightly different threshold than the conventional case. Its threshold behaves in between that of a hard and soft threshold.

A third exemplary denoising algorithm has the form of an integrated array solution: The method works on an array of input vectors that are highly correlated with the same or differing signal-to-noise ratio. A representative vector of the array is found and denoised. The denoised vector is thresholded and multiplied by each signal in the array. Therefore, samples set to zero in the denoised vector are set to zero in all input signals. Samples allowed to pass in the denoised vector are allowed to pass in the input signals. In this way all input signals are denoised. Then the top array of denoised vectors is summed and subtracted from the sum of the bottom array.

An exemplary embodiment of the V-IMU of the present invention denoises the angular rate sensor signals once per set of gyros per array to find the actual pitch, roll, and yaw angles. The V-IMU uses the accelerometers to correct for rate sensor drift in the vertical angles (pitch and roll); the V-IMU uses the magnetometers to correct for rate sensor drift in the yaw angle. The IMU takes advantage of the rate gyros' sensitivity to quick motions to maintain an accurate orientation when accelerations would otherwise throw off the accelerometers measurement of the IMU orientation relative to gravity; the IMU then uses the accelerometers to provide long-term stability to keep the rate gyro drift in check.

Figure 19:
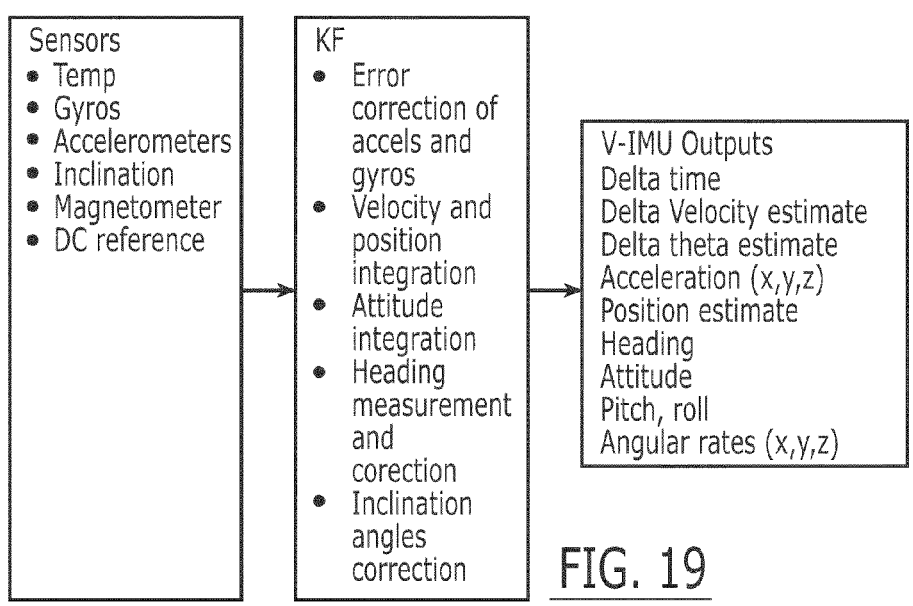
FIG. 19 shows data flow from sensors through the Kalman filter to IMU output.

A complementary Kalman filter estimates orientation, gyroscope offset, and magnetic disturbance by combining 3D gyroscope, accelerometer, and magnetometer signals using relevant signals (see FIG. 19). Both accelerometer and gyroscope signals are used to make an estimate of the inclination z. The direction of the global magnetic vector H is estimated by the gyroscopes and magnetometers. It is assumed that the magnetometer can compensate for local magnetic disturbances. As long as the disturbance is within a specified boundary, the new magnetic field vector can be used as a reference.

The Kalman filter and an output of the filter are connected to the measurement system to provide a correction signal for correction of gyro bias errors, the accelerometer errors, and the temperature derived from an internal temperature sensor to measure and correct for temperature extremes.

Error detection and test and compensation functions are embedded into the V-IMU hardware, and are connected to and controlled by the DSP firmware. Via a serial multichannel ADC, an accurate temperature sensor measures temperature of the sensor array to extend the temperature range operation of the gyros and accelerometer(s) beyond −40 to +105° C. A single voltage reference signal that is the ratiometric reference for the gyros is used as a single voltage reference for all gyros and accelerometers, and is used as the digital reference for both the wideband orthogonal digitized accelerometer inputs as well as the orthogonal inclination values. To test the improved performance of the "virtual accelerometer" design, a tiny array of accelerometers can be designed in an external module and the three virtual triaxial channels read into the V-IMU through three optional input ADC channels. The DSP algorithms cancel out the dc errors in the same way as implemented for the gyros.

To verify the proper operation of each individual gyro or 4×4 gyro subarray or 8×8 gyro array for each axis, each gyro is simultaneously digitized and stored in the DSP. Each signal can be processed separately or as a sub- or complete array per axis to sample performance, noise floor, or the average value of a set of gyros. The DSP initiates the self-test (ST) function for each gyro and each accelerometer axis. A continuous self-test mode does not affect the average output value of each sensor. Due to the complementary nature of the self-test function, any residue of the self-test signal at the output filter is minimized when the two self-test inputs are actuated sequentially. Using this feature, the output of each gyro can be adjusted for a given signal input level (G measurement). The output noise for each sensor as well as the sensor array can be measured and the cascade wavelet denoising filter parameters can be set based on these data. Finally, the denoising noise variances can be computed and used for setting the appropriate Kalman filter parameters throughout the hours of operation required by the mission. Finally, a Kalman filter reduces the errors further and computes accurate data of the types shown in FIG. 19.

In general, the higher the internal sampling rate and the bandwidth of the inertial sensors, the better the dynamic performance of the inertial measurement system. The proper internal data synchronization is also very important for accurate signal processing if the system is operated under a difficult dynamic environment. A high-precision internal time reference therefore is very important to be available inside of the IMU. The V-IMU operates with a high sample rate and sets wide sensor bandwidths. All gyro conversions are simultaneously sampled, and the accelerometer is sampled at high rates. The accurate time reference is set by the internal DSP clock.

The V-IMU uses a sophisticated Kalman filter to track the bias in the rate sensors after most dc errors have been eliminated using the gyro array and cascade wavelet filter. This makes the V-IMU very accurate in dynamic maneuvers.

The Kalman filter provides an on-the-fly calibration by providing a real-time characterization of the gyro bias state. The accelerometers provide an attitude reference using gravity and the triaxial magnetometer senses true North while compensating for magnetic metals close to the sensor location. These two sensors provide accurate and stable estimates of Euler roll, pitch, and heading angles.

The algorithm for blending the magnetometer attitude solution with the inertial attitude solution in real-time samples the output from the three gyro arrays at 1 to 10 kHz. The output from the gyros is numerically integrated to provide an estimate (time update) of the three Euler angles. A Kalman filter is used to blend the magnetometer/accelerometer inclination measurement attitude solution with the estimates obtained by straight integration of the gyros. This measurement is updated if GPS is present to error correct the remaining gyro drift rates.

A method for heading determination is described here that includes the effects of pitch, roll, and yaw as well as the magnetic properties of the module. Using solid-state magnetic sensors and a three-axis inclination sensor, a low-cost compass system functions within the V-IMU module.

The magnetic sensor can have significant distortions in the heading output provided by the compass due to its close proximity to the other sensors and the electronics and the metal frame used to mount and align the sensors to the three axes of reference, and thus calibration requires a substantial effort. Besides the constant magnetic declination, the compass is affected by local distortions of Earth's magnetic field. With a non-ferrous mechanical turntable used in initial calibration of the module, it is possible to measure these errors. The distortions can have peak-to-peak values of about 2 deg.

Unfortunately, it is difficult to build a working mobile platform that does not place some sources of magnetic distortion in the general vicinity of the compass. In the real system, compass errors can have peak-to-peak values of 5 degrees. The magnetic compass selected has an internal calibration procedure, which can take into account a static distortion of magnetic field. For dynamic distortions the compass provides an alarm signal, which is active when such error occurs, and then the compass measurement can be ignored and computations rely only on the gyro array.

The bias of the gyroscope array can be measured for each axis by averaging several minutes of output while the gyros are kept still. For scale, the specified values in the manufacturer's test sheets are used for each gyro. Using the initial calibration data for the inertial sensor assembly (bias, linear scale factors, gyroscopes triad non-orthogonality) measured for each module, the inertial sensors are validated. Important measurements include: the evaluation of the noise of the inertial data sets, static gyro calibrations to determine the supplementary nonlinear terms of the static transfer characteristics, considered only to degree 2, as well as the establishment of the nonlinear time and temperature behavior of the gyro's drift and scale factors and the non-orthogonality of the gyro's triad.

Since gyro outputs can change quickly in response to test setup specifications, gyros can be sampled at 1000 Hz. In contrast, the compass responds slowly and is read at 16 Hz over a serial line. Therefore, when compass and gyro inputs are read simultaneously, there is some unknown difference in the times of the physical events they each represent. It is possible to determine the relative latency by integrating the gyro outputs and comparing with compass readouts by shifting one datum in time until they best match. The relative latency is taken into account by attaching to each sensor readout a time tag. This is taken into account in the fusion step.

The individual nature of GPS and INS systems are complementary. GPS provides accurate position and velocity information that do not drift over time. A major limitation of GPS is that the output data rate is not sufficient for many applications. An INS system can provide attitude, position, and velocity information at extremely high data rates. A major disadvantage is that these measurements are subject to large errors if not aided by some external source, such as GPS. Thus, an integrated GPS/INS system can provide a user with highly accurate attitude, position, and velocity information at very high data rates.

There are principally two ways GPS and INS data can be combined. They are commonly known as loosely and tightly coupled systems. In a loosely coupled system, two processes must be performed sequentially. First, the GPS data must be processed by its own Kalman filter. The output position and velocity information can then be used by a separate filter when processing the inertial data, and is used to bind the INS measurement error growth. The major advantage to a loosely coupled system is its design simplicity relative to a tightly coupled system.

A tightly coupled system integrates both GPS and INS measurements into a single Kalman filter. This has several theoretic advantages over a loosely coupled system. First, any number of GPS measurements may be used by the filter; therefore, even if just one satellite is being tracked, those data can be used within the filter to help bind INS error growth. Additionally, it is possible that both cycle slips may be fixed in GPS data and ambiguity states preserved through periods of GPS signal masking/blockages. The disadvantage to such a system is the complexity of the design and the ability to make such a system functional in practice.

In this method, the virtual gyro signals can be processed separately and can be selected as a single channel, the running average of eight channels, or a twin matrix of opposing 4×4 signals. The wavelet denoising algorithm improves the performance of a selected gyro in each axis or multiple gyros in each axis. The wavelet-based denoising algorithms provide two inputs to a Kalman filter, for example, an unscented Kalman filter (UKF). Alternatively, other types of Kalman filters can be used, including, but not intended to be limited to, a simple, an extended, and a sigma-point Kalman filter. The two outputs include filtered gyro and accelerometer signals for x, y, z and the residue noise on all channels. The noise is monitored and processed by the UKF to update the algorithm. In this way, several different algorithms can be implemented and operated as standalones or in parallel as required by the application. The wavelet denoising algorithm improves the performance of the accelerometer by removing the noise while passing the signal on without the noise content.

The issue of the accuracy of the IMU/INS device of the present invention without the use of a GPS module has also been considered. The design is quite flexible and can be tailored to provide enhanced performance once the design is fully characterized on a rate table. The performance enhancements due to the "virtual" technology, both gyro and accelerometer, can be assessed and the algorithm suite improved to provide a measure of how much further this design can be pushed to meet short-term goals.

The focus of an embodiment of the design is threefold. First, how much additional performance can be realized by switching to the next-generation MEMS gyro device that is scheduled to be available in late 2006, now that the current gyros have been fully characterized with "virtual IMU" technology introduced in this design? Second, can a new accelerometer with much better specifications than the present device provide additional IMU performance? Finally, how much more performance can be realized by utilizing unscented KF algorithms to implement the navigation algorithm suite when GPS-denied has been applied to this unit?

Inertial navigation systems produce all the information that is necessary to completely analyze and explain the motion of an object to which it is attached, for example, a car, a rocket, or a soldier. In the near future many soldiers and vehicles are likely to be equipped with GPS receivers. However, when those GPS receivers are inside buildings, under dense foliage, underground or under water, the GPS signals can be masked. When this happens, the MEMS IMU equipped INS can provide interim navigation until GPS signals are restored and help re-acquire GPS. It is also possible that an enemy will jam the GPS signals. Again, the MEMS IMU-equipped INS can provide location information until GPS service is restored. A key question is how long can a GPS-denied system operate before the accumulated errors inherent in technology overwhelm the ability to predict accurate movements and relative location? Being small and low cost, a MEMS IMU/INS can support the guidance and navigation function in a wide variety of vehicles. Since many of these applications may only need seconds of operation, the errors will remain small. Longer operation times without GPS are needed to support the pointing and orientation for artillery and targeting equipment. Even longer times are needed to help locate soldiers during missions, whether operating in GPS clear zones or in GPS-denied environments.

Since MEMS-based accelerometers and gyroscopes are becoming more attractive to manufacturers of navigation systems because of their small size, low cost, light weight, low power consumption, and ruggedness, how can the inherent error sources be eliminated or reduced sufficiently to sustain operational needs over hours?

Accelerometers and gyroscopes are known as inertial sensors since they exploit the inertial property of bodies. IMUs use accelerometers to measure linear acceleration and gyroscopes to sense angular velocity. A major obstacle IMUs face is its loss of accuracy over time, which is reduced or eliminated by use of more accurate gyros and accelerometers. The operating principles for measuring orientation and position of a moving body using only gyroscopes and accelerometers have been established. High-performance accelerometers with μG resolution and gyroscopes with resolution better than 0.1 deg/h are in demand for inertial navigation systems. Currently, MEMS inertial sensors have grown to the status of commercial exploitation. However, the relatively low performances of these sensors limit their use to less demanding applications. The virtual IMU hardware solution of the present invention, utilizing multiple MEMS sensors to cancel DC errors inherent in MEMS sensor technology and combining the sensor array, realizes significantly improved performance per axis over a single device.

The technology of inertial MEMS sensors has undergone rapid change. MEMS offers several dramatic advantages. The first is what makes the technology possible to begin with: universally accessible fabrication. These tiny parts are manufactured using the same processes as integrated electronic circuits. Because of the manufacturing technology, 10,000 MEMS devices can be built as easily as one. Correspondingly, ease of fabrication allows engineers to change the way they design systems. Economies of scale make production inexpensive. In fact, this massive reduction in cost is the main driver for research. Today, low-cost accelerometers operate in the tactical performance range, while low-cost gyros operate on the outer edge of the tactical performance range.

The processing performed in an embodiment of the present invention significantly improves performance over that of any individual component device by combining multiple gyro devices, which are at present limited to between about 1 and 5 deg/h drift, as mentioned above, by one to two orders of magnitude. The differential ADC devices that are used for each of the gyro inputs are referenced to the reference output of each gyro, and thus all the output data swings ± this reference value, and the ADC can be centered over the 12-bit range for each device. In addition, the common mode noise of each gyro is reduced using this differential measurement technique.

The present invention can be used in a wide variety of applications. For example, the assembled device protects the sensors from high-G environments, which can damage the various parts as well as cause measurement errors. In addition, the small, light-weight design renders it an attractive movement detection tool for use by military ground troops. Finally, the substantial improvement in the accuracy of positioning information through the novel combination of multiple, specifically oriented MEMS gyro sensor arrays (hardware gyro), virtual gyros, Kalman filters, and an additional navigational algorithm suggests that the device could find use in guided weapon technology. One of the objectives of the military is to minimize collateral damage in a military confrontation. Accurate information about the location and path of the guided missile should help result in more accurate targeting. The invention is also expected to find use in other IMU applications requiring accurate gyro measurements.

Exemplary system performance values of the inertial measurement unit of the present invention are given in Table 1.

TABLE 1

| System Performance Values | |
| --- | --- |
| Dimensions | 2.24 × 1.01 × 0.83 in.³ |
| Volume | ~1.9 in.³ |
| Weight | <0.2 lbs. |
| Power | <2 W |
| Operating temp. range | −40 to +105° C. |

TABLE 1-continued

| System Performance Values | |
| --- | --- |
| Output data rate | Programmable 0.01 to 10 kHz |
| Gyro input range | ±300 deg/s |
| Gyro sensitivity | 6 mV/deg/s |
| Gyro noise density | 0.05 deg/s/root Hz |
| Angular random walk | 0.7 deg/root Hz |
| In run stability | 0.7 deg/Hz rms |
| Gyro bandwidth | Settable: typically 40 Hz, max. 3 kHz |
| Accelerometer range | ±4 G |
| Accelerometer sensitivity | 300 mV/G |
| Accelerometer noise density | 170 μG rt Hz (x, y); 350 μG rt Hz (z) |
| Resolution | <2 mG @ 60 Hz |
| Accelerometer bandwidth | Settable: 1 kHz (x, y), 550 Hz (z) |
| Inclination bandwidth | Settable: typ. 10 Hz |
| DSP speed | >500 MHz |
| SDRAM | 32 MB |
| Flash | 3 MB |
| ADC resolution | 12 bits |
| Selectable simultaneous sample rate (gyro) | Programmable, typ. 10 KSPS/ch., max. 1 MSPS/ch. |
| Selectable sample rate (accel.) | Programmable, typ. 1 KSPS/ch., max. 100 KSPS/ch |
| Primary digital interface | RS232 or 10/100 Ethernet |
| Secondary digital interface | SPI, UART, JTAG |
| Unused analog interface | 3 12-bit input ch., 4 16-bit output ch. |
| Electrical input voltage | 5.5 or 7-24 V dc |
| Electrical output voltage | 5.5 V |
| GPS module | UART/SPI bus interface |

The V-IMU of the present invention has four separate modes of operation: calibration, IMU, attitude, and INS. The modes are user selectable from the external Ethernet linked GUI. At power-on, the V-IMU loads the communication protocol with the external GUI. The user selects the desired mode of operation and the software suite download pulls the corresponding user configuration data from non-volatile memory. If no mode is selected, the default value for the initial operation mode is calibration followed by IMU.

The calibration mode represents the most basic operation. In this mode, the V-IMU acquires calibrated values for angular rate, acceleration, and magnetic field. The inclination measurements from the triaxial accelerometer and the angular rate measurements from the gyros are read in, the self-test mode (ST) is initiated, and the errors detected by the ST are measured. The unit adapts, is corrected for all detected errors, and provides the initial values of delta acceleration, delta rate, and delta velocity. The calibration default setting loads default error values.

The IMU mode represents the most basic operating mode. In this mode, the V-IMU uses calibrated values or previously stored values for angular rate, acceleration, and magnetic field. All sensors begin standard operations. The unit adapts to corrected values of angular rate, acceleration, inclination, and North pointing and provides continuous values of delta acceleration, delta rate, and delta velocity.

Attitude mode (AM) adds basic attitude estimation to the IMU mode. In this mode, the data from the rate sensors are accumulated to provide an estimate of attitude. To correct the error drift, the gravity vector (as measured by the accelerometers and corrected by the inclinometer measurements) is used as an indication of whether the V-IMU is level. Additionally, the magnetometer data are used as an indication of North direction. The vertical gyro algorithm heavily relies on the rate sensors so that errors induced from platform acceleration are minimized. A calibration mode under AM, where the unit is first rotated and then its z vector is tilted back and forth are successive modes in which algorithms correct for anomalies, the accelerometer bandwidth is widened, and the full response of the gyros is initiated.

In INS mode, a GPS unit is connected to the V-IMU. This connection can be made over the Ethernet, via a serial bus, or from a second DSP core that replaces the single core DSP device. The communication link and the coupling of the navigation algorithm with the IMU algorithm suite defines how closely coupled the GPS and IMU sensors are joined. The V-IMU provides estimates of position, velocity, and attitude at up to 50 Hz using a state estimation filter. Error-corrected angular rates and accelerations are provided as well. In order to enter INS mode, the V-IMU must be configured for INS operation and GPS must be available and initialized. The V-IMU will not transition into INS mode without a GPS. The V-IMU will remain in extended V-IMU mode until the accuracy of its estimates degrades to an unacceptable level due to lack of GPS measurements.

In order to address some issues that arose during testing of the above-disclosed device, an additional embodiment has been conceived having improved-accuracy algorithms with full motion compensation and sufficient robustness to survive shock levels in excess of 20,000-G forces.

The device 300 of this embodiment includes a gyro layout substantially the same as that illustrated in FIG. 6, having three temperature-compensated arrays of commercial-grade MEMS gyros. These sensors are combined with a near-real-time embedded algorithm suite to achieve improved performance.

Figure 26:
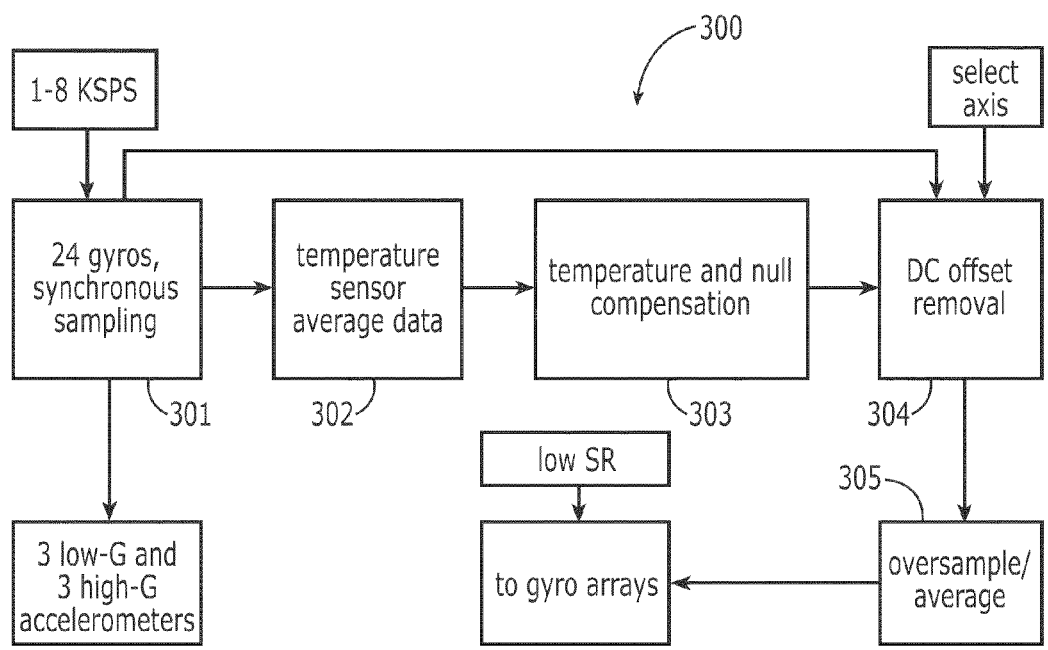
FIG. 26 is a block diagram of the process for converting gyros to precision instruments.
Figure 28:
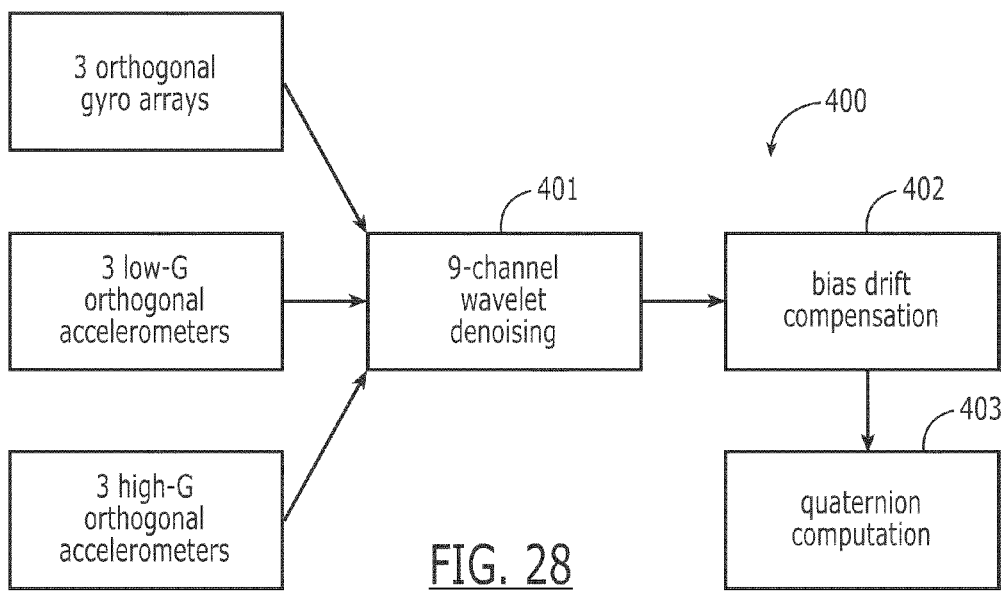
FIG. 28 is a block diagram of the algorithm flow for IMU calculations.

Table 2 shows that single commercial-grade devices are specified at 50 deg/h in run stability, whereas the present device measures <0.2 deg/h/axis. These data also indicate how the present improvements compare with both a commercial-grade IMU and an HG1930 IMU. The low scale-factor errors and stability demonstrate the effectiveness of the present device 300 with an embedded fine alignment solution.

performance (FIG. 26). The other 400 operates on the fused arrays with downstream near-real-time processing (FIG. 28).

Taking advantage of the MEMS gyros (block 301) newly introduced in the art, the individual gyro temperature sensor (block 302) embedded into each gyro device is used to compensate for both temperature changes and null changes of each gyro (block 303). In a particular embodiment, each gyro noise spectral bandwidth is shaped using two passive filters so as to attenuate high-frequency demodulation artifacts by approximately 18 dB. The optimum settings for each device are upgraded once per second. The temperature sensor embedded in each gyro is read, and the readings are averaged. These data are supplied along with the current gyro reading to two quadratic equations, whose coefficients are provided with each device from factor data read in via an EPROM, linked together and operating in the background for each of the gyros. Temperature compensation is achieved over the entire range of −40° C. to >>+85° C. Accuracy is improved by using DC offset removal at two temperature points, recalibrating the gyros to reduce drift. These equations can be extended to both −60° C. and +105° C., if needed, using a simple recalibration procedure when measuring below 1° C. Thus each gyro is processed for optimum temperature and null compensation to create 24 precision gyro devices.

The IMU measures each gyro temperature sensor continuously and corrects each device once per second to achieve maximum overall accuracy. This embedded temperature compensation algorithm improves null stability by over three times (3×), based on the vendor factory reports that individual gyro temperature compensation can achieve better than 75 deg/h null stability with 5 data points over the complete temperature range.

TABLE 2

Component Performance Comparison

| Components and Performance Factors | ADI Commercial IDU | Device of the Present Invention | HG1930 |
|---|---|---|---|
| Gyro | | | |
| Range | ±300 deg/s | ±1125 deg/s | ±1440 deg/s |
| In-run stability | 54 deg/h | 0.2 deg/h | 20 deg/h |
| Gyro fixed bias | | 52 deg/h | 20 deg/h |
| Angular random walk | 4.2 deg/h$^{1/2}$ | 0.383 deg/h$^{1/2}$ | 0.3 deg/h$^{1/2}$ |
| Gyro scale factor error | | 53 ppm | 350 ppm |
| Gyro scale factor stability | | 81 ppm | 300 ppm |
| Accelerometer | | | |
| In-run bias stability | 0.7 mG | 0.04 mG | 0.5 mG |
| Velocity random walk | 2.0 m/s/h$^{1/2}$ | 0.45 m/s/h$^{1/2}$ | 0.15 m/s/h$^{1/2}$ |
| Accelerometer bias | | 0.2 mG | 4 mG |
| IMU Module | | | |
| Self-test | All gyros, accelerometers | All gyros, 6 accelerometers | |
| ADC resolution | 14-bit | 16-bit | |
| Processing | None | Blackfin (500 MHz) | ARM |
| Sensors | Gyros, 1 set of triaxial accelerometers | Gyros, 2 sets of triaxial accelerometers, digital 3D compass | Gyros, three 30-G accelerometers |
| Max. sample rate | 819 SPS | 2000 SPS | 2400 SPS |
| Power | 5 V, 33 mA | 8 V, 225 mA (1.8 W) | 3 W |
| Weight | 16 g | 65 g | 159 g |
| Temperature range | −40-+85° C. | −40-+85° C. | −55-+85° C. |

Two algorithm streams have been embedded in this embodiment of an IMU. One algorithm 300 initializes and continually adjusts the gyro devices individually for optimum Temperature chamber testing results indicate significant improvements in null stability. An analysis of several data runs recorded over the temperature range from +25 to +70 to −40 and back to +25° C. showed that if the gyro dc offset of each gyro axis were reset at 0° C. and followed a two-piece quadratic algorithm solution that replaces the single quadratic solution implemented at present, the accuracy of the temperature compensation would improve significantly over a wider temperature range. This same compensation technique can be applied to accelerometer arrays. Thus the IMU, accelerometer arrays can be optimized for performance in a similar fashion using factory-supplied temperature coefficient data.

Figure 27:
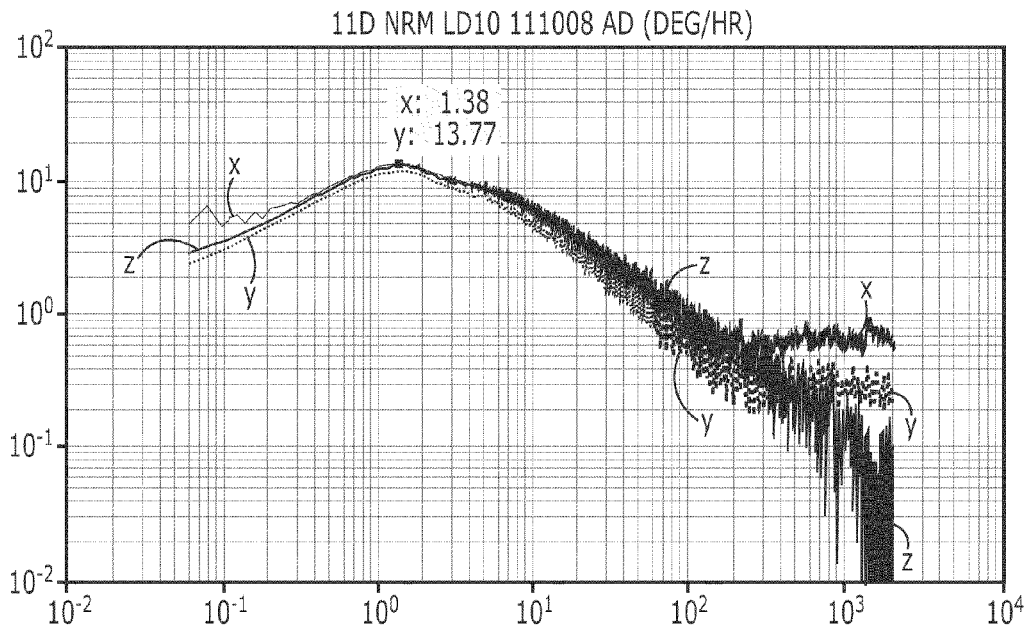
FIG. 27 is an Allen distribution curve for x-, y-, and z-axis gyros for an embodiment of an IMU device.

The results shown in FIG. 27 illustrate that when several stages of compensation are combined in order to reduce the noise sources, a goal of <1 deg/h drift can be attained. To achieve this, each gyro is first converted into a precise instrument using null and temperature compensation as discussed above. Next the output of each gyro device is oversampled by increasing the sample rate beyond 2000 samples per second (SPS) for each ADC assigned to each gyro device. Then the gyro output channel data are averaged to a specified sample rate, and the remaining DC offset is removed (block 304).

The integrated algorithm process eliminates the DC offset of each gyro created by the combined gyro and ADC DC offset errors. The DC offset value is measured for each gyro, and that value is saved in EEPROM. Then that value for each gyro is subtracted to zero the DC position of the gyro and the 50/50 swing adjusted by null compensation so that the sensor fusion computation is optimized. In this way, both the individual MEMS gyros and each gyro array have been optimized to operate at maximum precision.

This procedure removes earth rate unless the gyro axis is aligned parallel to the equator. The user can call up a specific mode ("zoom mode") for detecting earth rate. In this mode, the DC offset computation is eliminated. Then the gyro measurement range is narrowed, which increases the gyro channel sensitivity to measure earth rate, which can be well below the noise floor in the standard mode. The zoom mode then utilizes the wavelet denoising algorithm to recover the slowing changing earth rate in a channel with a lower noise floor than in the standard modes of operation, so earth rate is detectable.

The factory can choose which if any of these processes can be eliminated for a specific application. For example, one algorithm is used to control the 24 gyro ADC sample rate settings for the oversample process. A separate algorithm is used to match the sample rate of the individual gyros before the combining algorithm is initiated for the embedded follow-on algorithm suite operating in near real time. This allows the averaging of subsequent gyro readings at high oversampled rates (block 305; programmable setting: 2-8 KSPS) and supply the follow-on processing sampling at lower rates (e.g., 500 or 125 SPS) to take advantage of gyro noise averaging and to reduce the delays inherent in the high-sample-rate real-time wavelet denoising algorithm.

To perform IMU optimization after fabrication and encapsulation, the procedure for the substitution of one gyro for another in each orthogonal sub-array achieves further performance optimization. This procedure eliminates noisy gyro devices as well as optimizing the performance of each channel in terms of gyro drift and angle errors. To summarize, in terms of Allan deviation improvements as but one measure of comparison, the best single gyro curve measures >50 deg/h drift. The results of the Allan deviation curve after temperature/null/oversampling/offset and averaging followed by wavelet denoising measures between 7.2 and 10 deg/h drift stability, as shown in FIG. 27. This represents a seven-fold (7×) improvement factor.

Figure 30:
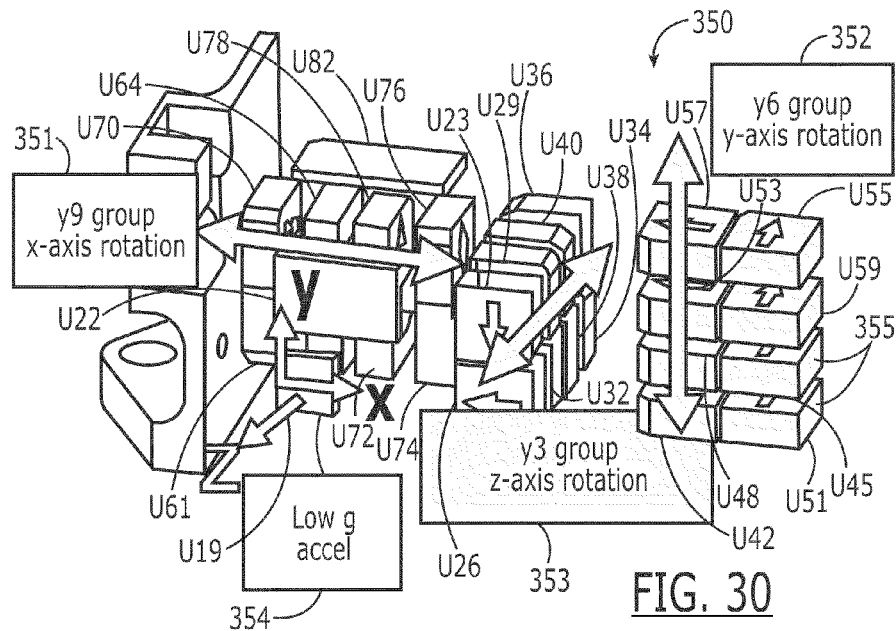
FIG. 30 is an exploded schematic of the components of an exemplary embodiment of an IMU.

Improvements have also been made to the near-real-time algorithm suite 400 for the arrays, the flow for which is illustrated in FIG. 28, and the orthogonal orientation of which is illustrated in FIG. 30. When surface micromachined sensors are treated, not as individual instruments, but as arrays, the positioning of the devices in the module as well as the fusion and filtering mathematics, reduce the inherent silicon noise sources. Although exemplary chips from Analog Devices, Inc., have been used, the technique can be applied to any single- or multiple-axis device. In this exemplary embodiment 350, a total of three groups 351-353 (one for each of the x, y, and z axes) of eight gyros 355 each are used, totaling 24 gyros. One low-G accelerometer 354 is visible in this view.

The outputs comprise digital voltage signals from the fused gyro signals and the two sets of accelerometers, all with signal conditioning performed internally in an DSP. The individual gyro sensor analog outputs are sampled by 16-bit analog-to-digital (ADC) devices at a 2-kHz sampling rate, and the accelerometer outputs are sampled by 16-bit ADCs at 0.25-kHz sampling rates. All the gyro data channels are synchronized and sampled simultaneously to simplify the algorithm processing.

The wavelet denoising algorithm (block 401) operates in near real time to greatly reduce higher-frequency random noise and reveals lower-frequency bias fluctuation, particularly for the gyros. This is addressed by the application of real-time gyro bias drift compensation (block 402) using simple linear Kalman filters, one for each gyro axis, referenced by the accelerometers' sensing of angle relative to the gravity vector. This has been demonstrated to be effective for gyro drift compensation when the IMU is stationary. For proper implementation of the gyro drift compensation, it is important to achieve accurate factory calibration and alignment of the gyros and accelerometers. The delays for the wavelet denoising computations have been reduced significantly in the present device 350. The three additional embedded algorithms, the fine alignment settings and computations, the gyro combining array computations, and the gyro bias drift compensation (block 402) computations all operate in real time.

Figure 31:
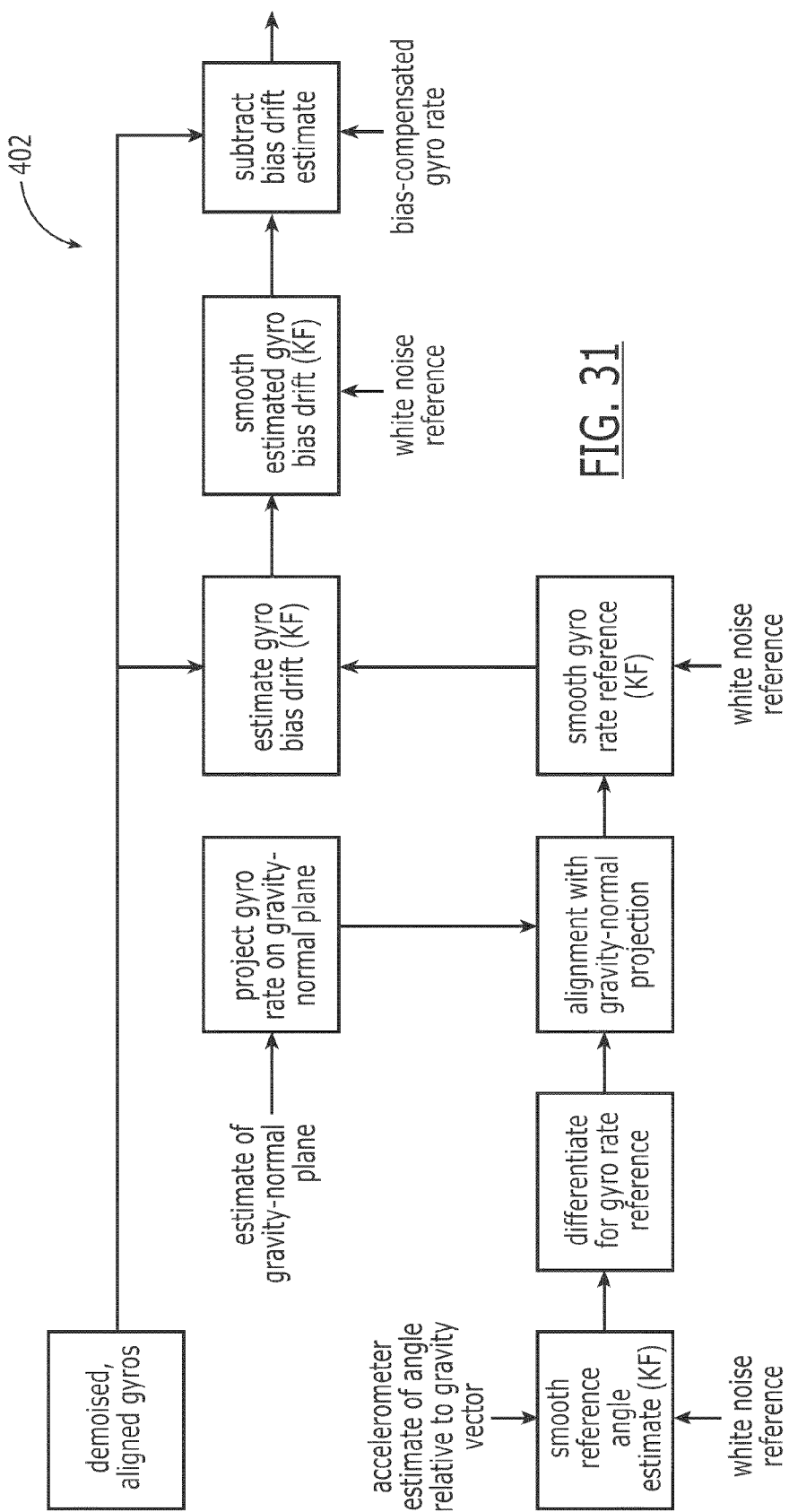
FIG. 31 is a flowchart of details of an exemplary gyro drift compensation architecture.
Figure 32:
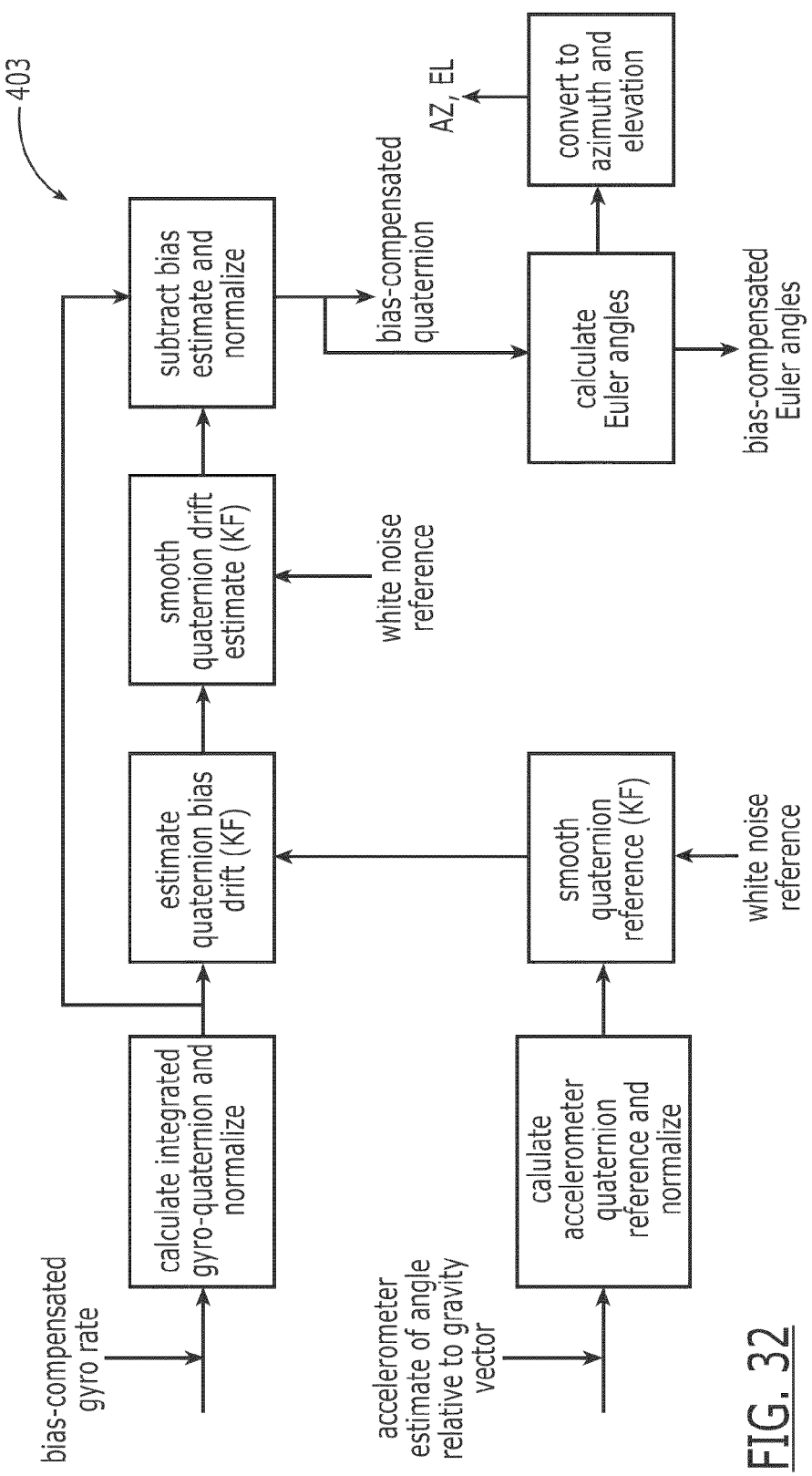
FIG. 32 is a flowchart of details of an exemplary residual gyro-bias compensation applied to the quaternion angle representation.
Figure 33:
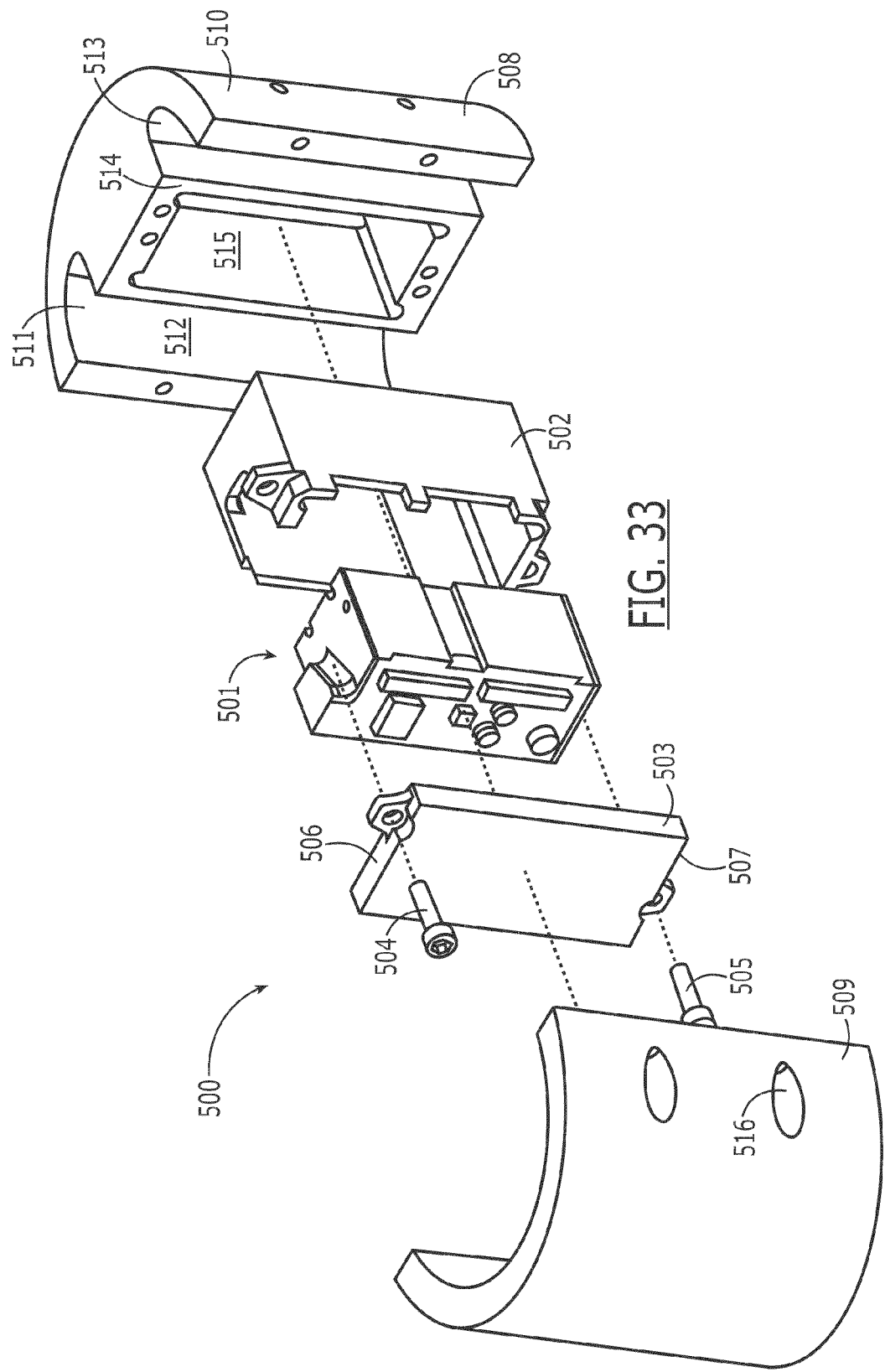
FIG. 33 is an exploded view of an exemplary exoskeleton housing for the IMU of the present invention.

Details of the gyro drift compensation architecture 402 are illustrated in FIG. 31.

To apply the bias-drift-compensated technique to general motion, it was first necessary to achieve calibration and fine alignment of the accelerometers and gyros. The components were positioned in the potted assembly. The three-axis accelerometers of this embodiment are contained within a single integrated circuit package, and the axes are specified to be mutually orthogonal to within 0.1 deg. The accelerometer frame, however, was found to be slightly skewed relative to the IMU external surfaces, which are not precisely parallel and orthogonal. Also the response from each axis is subject to a small, unknown, zero-gravity bias error.

To correct for the zero-gravity bias, it was necessary to separate the constant-gravity response from the unknown bias in order to accurately correct by measuring and subtracting the unknown bias. A procedure was devised in which static measurements are first taken in six different positions referenced by the IMU external surfaces, each pair of surfaces nearly aligned orthogonal to the gravity axis for two positions. A set of six independent quasi-linear equations relating the unknown biases can be formed and differenced in pairs to produce three linear equations from which the unknown offsets were determined.

After correction and rescaling by the Euclidean norm of the three-axis gravity response, the Euler angles required to rotate the accelerometer frame to align with the gravity axis were determined. Removal of the unknown zero-gravity bias is necessary also to track the orientation of the accelerometer frame during dynamic motion. It has been determined that the rms error in alignment is less than 2 mrad over a 5-sec interval. This is sufficient to accurately track rotation relative to the gravity axis for the purpose of referencing the gyro bias compensation and quaternion bias compensation filters, to be described in the following.

The gyros must also be aligned with the accelerometer frame. Unlike the accelerometers, the gyros consist of three separate packages, each comprising a group of eight integrated circuits assembled to define a single rotation axis. Within the IMU each gyro group rotation axis is skewed with respect to its corresponding accelerometer axis. The purpose of the alignment is to find the rotation transformation that aligns the axes with respect to their orientation and to measure the signs of rotation. The process can be separated into coarse and fine alignment. Coarse alignment associates the gyro axes with their corresponding accelerometer axes and determines the sign of rotation for each. This is facilitated by rate table measurements, each positioning an orthogonal IMU surface normal to the vertical gravity vector. While the axis association can be determined from the physical orientation of the gyro groups in the folded package, that axis association can be verified by forming the cross-products between the three-axis gyro and accelerometer response vectors subject to rotational motion around the gravity axis. After the correct permutation of gyro response vectors was confirmed, the sign of rotation of each gyro axis was found by forming the scalar products of the gyro and accelerometer response vectors with knowledge of the direction of rate table rotation. The coarse gyro alignment results, which have been determined, are applicable to all IMU units having the same construction.

Fine alignment requires similar rate table measurements with careful positioning of the IMU so that the gyro axis for each position is coaxial with the rate table's vertical rotation axis. A special positioning fixture was fabricated for this, after which the rate table measurements were performed. From these data on the fine alignment of the gyros, the dynamic gyro bias-compensation process was implemented and tested. Fine alignment of the gyros requires separate measurements and alignment computations for each different unit during factor calibration.

The wavelet denoising embedded algorithm (block 401) has been modified to operate at near-real-time operation in response to issues experienced during testing. When the size of the wavelet denoising data packets was reduced by fourfold (4x), it was thought that performance sensitivity would be impacted. This was not the case. The preproduction units still meet both the ±1125 deg/sec range, as well as the 2 mil angle drift, and are less than 0.5 deg/h in run gyro drift performance levels when measured for less than 30 min. The units with ±250 deg/sec angular rate range and narrower bandwidth still achieve Allan deviation levels of less than 0.1 deg/h gyro drift. As a result of these changes, the near-real-time operation was improved from 17% to 50% on time responsiveness.

The use of wavelet denoising for both the accelerometers and the combined gyros of each axial group greatly reduces the higher-frequency random noise and reveals the lower-frequency bias fluctuation, particularly for the gyros. This presents an opportunity for real-time bias drift compensation using simple linear Kalman filters, one for each gyro axis, referenced by the accelerometers' sensing of angle relative to the gravity vector. This has been demonstrated to be effective for gyro drift compensation when the IMU is stationary.

Figure 29:
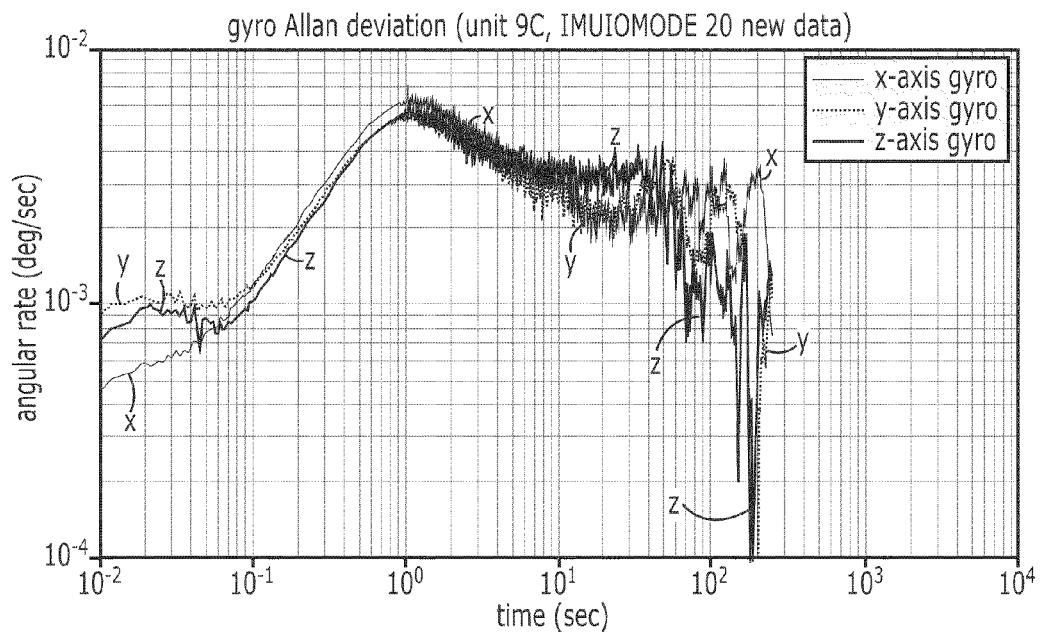
FIG. 29 is an Allen distribution curve for x-, y-, and z-axis gyros for another embodiment of an IMU device.

FIG. 29 shows the Allan deviation curve for all 3 gyro axes of an exemplary unit. This vastly improved performance is attributable to the new gyro bias compensation algorithm (block 402) processing that follows directly after the wavelet denoising operations (block 401) for all three gyro channels. In comparison with commercial gyro drift performance (Table 2, In-run stability), this unit demonstrates a factor of greater than seventy seven-fold (>77x) improvement for the least sensitive axis and over five hundred times (500x) for the best-case z axis. Other IMU units have shown even better gyro drift performance; hence, there will be a future focus on unit-to-unit and axis-to-axis consistency.

A procedure for accurate alignment and scale factor correction has been developed, tested, and implemented. The computations for each IMU are derived from the 6-position data recorded on the rate table. This exemplary unit contains the alpha version of this algorithm solution. The resulting information is recorded in the EEPROM for each IMU. The data are used by the embedded computations to perform alignment and scale factor corrections for the 3 gyro channels and the low-G triaxial accelerometer. This procedure will be expanded to include the alignment and scale factor correction of the high-G accelerometers as well. In future, the alignment algorithm operations will be expanded for the IMU packaged in the enclosure to eliminate misalignment errors.

To address the issue of earth rate detection, a new "zoom in" mode has been incorporated into the control software to allow the user to select a mode whereby each gyro sub-array sensitivity is enhanced to detect signals at much lower noise levels by taking advantage of controls for angular rate range, 16-bit ADC range, and wavelet denoising threshold levels. The user can eliminate the routine that corrects for DC offset in this mode to assist in the acquisition of earth rate and the determination of north-pointing reference.

Another embodiment of this algorithm includes the implementation and test of a real-time wavelet filter as well as the implementation of quaternion computations (block 403) to create a mode to display INS outputs. Details of the residual gyro-bias compensation applied to the quaternion angle representation are provided in FIG. 32. Since some applications cannot tolerate any delay, a denoising filter similar to that used in embedded processing for medical instrumentation will be tested and comparisons with the present implementation will be made.

Several CGCS deficiencies noted in testing have been identified and are being addressed. Near-real-time performance is not acceptable for medium- and high-speed scenarios, especially those for projectile applications. At present, the unit has a small time delay before data are recorded to a laptop at the 460-kb rate. Additionally, the gyro drift compensation algorithm does not operate over the full angular range of +1125 deg/sec. An angular range of ±200 deg/sec has been measured. This was due to a computational overflow error detected in the fixed-point mathematics, which is being corrected. A "dead zone" was also measured near zero angular rate. This is the range where the static gyro compensation algorithm is switched off if significant rotation is detected on an axis (individually). Additional algorithm development will be undertaken to replace the switch with a full motion compensation algorithm.

Although the triaxial accelerometer is reported to have improved performance and better shock survivability without DC offset damage, arrays of these accelerometers may be required to achieve the upgraded performance needed to specific requirements.

The data for a shock surviving IMU as well as all 32 individual sensor channels were recorded and analyzed. Direct comparisons of each sensor device both before and after exposure to high-G shocks showed that the shock did change the DC offset setting of several gyros and the low-G accelerometer device. The DC offset for each orthogonal gyro axis showed significant change for one axis but little or no change for the other two axes. The Allan deviation measurements were directly impacted, however. MEMS gyros as well as the combined array of precision gyros are quite sensitive to DC offset. One device in the array with offset can degrade array performance. Measurements showed that two of the axes defaulted to pre-gyro compensation ranging from 14.5 to 11 deg/h and 1-1.2 deg/h for in-run drift because of the changes to DC offset. These data measurements identified in the post-shock testing identifies the need to add a dynamic compensation element to the present precision instrument algorithms of FIG. 26 in order to reduce the impact on DC offset caused by high-shock encounters.

In order to operate under motion conditions, the alpha version of embedded gyro drift compensation has a mode switch function. At present, angular motion can be detected independently in each axis. When significant angular rate is detected, the bias compensation computation is bypassed. When the motion is reduced sufficiently, bias compensation is restored. This creates a "dead zone," as measured. For large values of DC offset, the switch will not reset and the bias compensation will be removed.

MEMS device factory discussions were conducted to address the DC offset error observations after shock exposure. An improved triaxial device, the ADXL335, is now available that will provide much improved operation at high g shock levels. An improved gyro is also being sampled that will have improved noise floor performance as well as improved high g shock performance. Note that the high-G accelerometers did not demonstrate much change in DC offset levels after shock exposure.

FIG. 29 depicts the efficacy of the high-G miniature IMU, plotting the gyro Allan deviation for the x, y, and z axes.

Laboratory tests are underway to evaluate both an improved production triaxial accelerometer as well as an array of these triaxial accelerometers to replace the present preproduction device. The IMU layout will be modified to accept either solution in the next fabrication cycle. The next fabrication cycle will also utilize the improved version of the gyro device now in use to reduce the noise floor by two times (2x). Both devices will provide improved performance.

An IMU 500 is also provided having improved exemplary package enclosure (FIG. 33), or housing, also provides additional ruggedness and IMU alignment assistance. This embodiment 500 includes an exoskeletal arrangement wherein the electronic element package 501 is positioned inside a substantially box-like primary housing having a primary casing portion 502 and a primary lid 503 affixable thereto using, for example, a pair of screws 504,505 along a top 506 and bottom 507 thereof. The primary housing 502, 503 is then positioned within a substantially cylindrical secondary exoskeletal housing, which comprises a secondary casing portion 508 and a secondary lid 509 affixable thereto. The secondary casing portion 508 has a semi-cylindrical outer wall 510. An interior wall 511 describes a portion of a cylinder on opposed sides 512,513 thereof. Between the opposed sides 512,513 is a substantially box-like support 514 for holding the primary housing 502,503 within an interior space 515. The secondary lid 509 comprises a semi-cylindrical element matable with the secondary casing portion 508 using, for example, countersunk screw holes 516, although this is not intended as a limitation. When joined, the secondary casing portion 508 and secondary lid 509 substantially describe a cylindrical element.

Algorithm upgrades are underway to address the need for real-time performance and 100% motion compensation.

The IMU of the present invention uses off-the-shelf sensor technology to achieve better than tactical-grade performance. That is, from commercial-grade devices, the performance enhancement is more than two orders of improvement in drift and accuracy. The individual MEMS devices' performance levels are purposely limited so that these devices can be sold worldwide.

This performance level has been achieved with the use of an advanced suite of algorithms that have optimized individual gyro performance, optimized gyro array performance, and combined wavelet denoising and static bias compensation to achieve a stable and accurate IMU.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An inertial measurement unit comprising:
a base comprising a plurality of physically distinct sectors;
three groups of orthogonally oriented angle rate sensors, each group positioned on a different sector of the base;
three high-G orthogonally oriented accelerometers positioned on the base;
three low-G orthogonally oriented accelerometers positioned on the base; and
a processor positioned on the base, wherein
the processor receives signals from the three groups of angle rate sensors and the three high-G and three low-G accelerometers and calculates at least one of a change in attitude, a change in position, a change in angular rate, a change in velocity, and a change in acceleration of the unit over a plurality of finite time increments.

2. The unit recited in claim 1, wherein the processor combines output from each group of the angle rate sensors to form a composite angle rate signal for each group of the angle rate sensors, for denoising the composite angle rate signals and the six accelerometer signals, and for calculating from the denoised composite angle rate signals and the three accelerometer signals the at least one of a change in attitude, a change in position, a change in angular rate, a change in velocity, and a change in acceleration of the unit.

3. The unit recited in claim 2, further comprising a wavelet denoising algorithm adapted to produce a denoised signal resulting from the denoising.

4. The unit recited in claim 3, further comprising a Kalman filter adapted to receive the denoised signal from the wavelet denoising algorithm, the Kalman filter for reducing sensor errors.

5. The unit recited in claim 3, processor further comprises means for performing a bias drift compensation on the denoised signal.

6. The unit recited in claim 1, wherein the angle rate sensors each comprise an oversampled, temperature-, bias-, and bias-offset-compensated gyro.

7. The unit recited in claim 1, wherein the three sets of orthogonally oriented angle rate sensors comprise:

three sets of angle rate sensors oriented triaxially in a first direction, each set oriented normal to the other two; and three sets of angle rate sensors oriented triaxially in a second direction opposite the first direction, each set oriented normal to the other two.

8. The unit recited in claim 7, wherein each of the sets of angle rate sensors comprise four gyros oriented at 90-degree increments.

9. The unit recited in claim 1, wherein the angle rate sensors comprise micro-electro-mechanical system (MEMS) gyros and the low-G and the high-G accelerometers each comprise a MEMS accelerometer.

10. The unit recited in claim 1, wherein the base comprises a unitary, substantially planar base, the sectors oriented relative to each other to form a three-dimensional structure having at least three faces, each face comprising at least one sector.

11. A method of making an inertial measurement unit comprising:
   positioning three groups of orthogonally oriented angle rate sensors on a base, each group positioned on a different sector of the base;
   positioning three high-G orthogonally oriented accelerometers on the base;
   positioning three low-G orthogonally oriented accelerometers on the base;
   positioning a processor on the base;
   receiving signals from the three groups of angle rate sensors and the three high-G and three low-G accelerometers into the processor; and
   calculating from the received signals at least one of a change in attitude, a change in position, a change in angular rate, a change in velocity, and a change in acceleration of the unit over a plurality of finite time increments.

12. The method recited in claim 11, wherein the calculating comprises combining output from each group of angle rate sensors to form a composite angle rate signal for each group of angle rate sensors, denoising the composite angle rate signals and the six accelerometer signals, and calculating from the denoised composite angle rate signals and the three accelerometer signals the at least one of a change in attitude, a change in position, a change in angular rate, a change in velocity, and a change in acceleration of the unit.

13. The method recited in claim 12, wherein the denoising step comprises using a wavelet denoising algorithm adapted to produce a denoised signal.

14. The method recited in claim 13, wherein the calculating step further comprises using a Kalman filter adapted to receive the denoised signal from the wavelet denoising algorithm, the Kalman filter for reducing sensor errors.

15. The method recited in claim 13, wherein the calculating step further comprises performing a bias drift compensation on the denoised signal.

16. The method recited in claim 11, wherein the angle rate sensors each comprise an oversampled, temperature-, bias-, and bias-offset-compensated gyro.

17. A method of calculating from inertial measurement unit data at least one of a change in attitude, a change in position, a change in angular rate, a change in velocity, and a change in acceleration of the unit over a plurality of finite time increments comprising:
   receiving angle rate data from three groups of orthogonally oriented angle rate sensors oriented;
   receiving accelerometer data from three high-G orthogonally oriented accelerometers and from three low-G orthogonally oriented accelerometers, the accelerometer on the inertial measurement unit; and
   calculating from the received angle rate data and the received accelerometer data at least one of a change in attitude, a change in position, a change in angular rate, a change in velocity, and a change in acceleration of the unit over a plurality of finite time increments.

18. The method recited in claim 17, wherein the calculating step comprises combining output from each group of angle rate sensors to form a composite angle rate signal for each group of angle rate sensors, denoising the composite angle rate signals and the six accelerometer signals, and calculating from the denoised composite angle rate signals and the three accelerometer signals the at least one of a change in attitude, a change in position, a change in angular rate, a change in velocity, and a change in acceleration of the unit.

19. The method recited in claim 18, further comprising performing bias drift compensation on the denoised composite angle rate signals.

20. The method recited in claim 18, wherein the denoising step comprises applying a wavelet denoising algorithm to produce a denoised signal.

21. The method recited in claim 20, further comprising applying a Kalman filter to the denoised signal for reducing sensor errors.

22. The method recited in claim 17, wherein each of the angle rate sensors comprises a gyro having embedded therein a temperature sensor, and further comprising, prior to the angle rate data receiving step:
   using data received from each of the temperature sensors, performing a temperature and null change compensation for each gyro; and
   measuring each gyro temperature sensor at a predetermined frequency; and
   correcting each gyro using the respective measured gyro temperature, for maximizing accuracy of each gyro.

23. The method recited in claim 22, further comprising performing a DC offset removal following the gyro correcting step.

24. The method recited in claim 23, further comprising averaging data from the gyros at an oversampled rate.

* * * * *